(12) United States Patent
Naude

(10) Patent No.: US 7,100,466 B2
(45) Date of Patent: Sep. 5, 2006

(54) ANGULAR VELOCITY PROFILE GENERATOR

(75) Inventor: Johannes Jacobus Naude, Randburg (ZA)

(73) Assignee: Varibox (PTY) Limited, Boksburg (ZA)

( * ) Notice: Subject to any disclaimer, the term of this patent is extended or adjusted under 35 U.S.C. 154(b) by 532 days.

(21) Appl. No.: 10/469,777

(22) PCT Filed: Sep. 11, 2002

(86) PCT No.: PCT/ZA02/00137

§ 371 (c)(1),
(2), (4) Date: Sep. 4, 2003

(87) PCT Pub. No.: WO03/056212

PCT Pub. Date: Jul. 10, 2003

(65) Prior Publication Data

US 2004/0089085 A1   May 13, 2004

(30) Foreign Application Priority Data

Jan. 4, 2002   (ZA) .................................. 2002-0066

(51) Int. Cl.
*F16H 27/00* (2006.01)
(52) U.S. Cl. .............................. 74/112; 74/113; 74/116
(58) Field of Classification Search .................. 74/111, 74/112, 113, 116, 117
See application file for complete search history.

(56) References Cited

U.S. PATENT DOCUMENTS

| 1,516,070 | A | | 11/1924 | Amedee-Mannheim | |
|---|---|---|---|---|---|
| 1,916,283 | A | | 7/1933 | Pressler | |
| 2,379,454 | A | | 7/1945 | Nowka | |
| 2004/0089085 | A1 | * | 5/2004 | Naude | ......................... 74/116 |
| 2005/0097974 | A1 | * | 5/2005 | Espinosa | ....................... 74/111 |

FOREIGN PATENT DOCUMENTS

| FR | 750 690 | 8/1933 |
|---|---|---|
| FR | 916 850 | 12/1946 |
| WO | WO 02/14715 | 2/2002 |

* cited by examiner

*Primary Examiner*—David Fenstermacher
(74) *Attorney, Agent, or Firm*—Young & Thompson

(57) ABSTRACT

An angular velocity profile generator [22,24] comprising an input shaft [46], an output shaft [56], a universal joint coupling the shafts by pivot pins [70,75] situated on two pivot axes which are normal to one another, means [49] in the joint for varying the path of rotation of the pin [70] relatively to that of the pin [75], a first control arrangement [32] for varying the angle between the shafts and a second control arrangement [84], external to the universal joint, connected to the pivot pin path varying member which is activated by the first control arrangement to suit a specific velocity profile produced by the generator. The invention extends to an infinitely variable transmission machine including transmission stages [16] which each include two of the profile generators connected in series and an angular velocity profile portion extraction device.

31 Claims, 20 Drawing Sheets

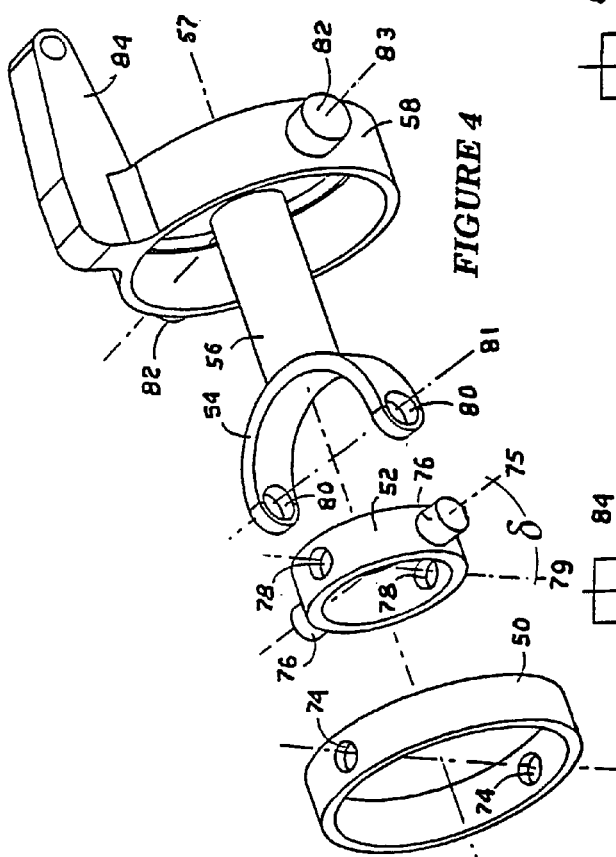
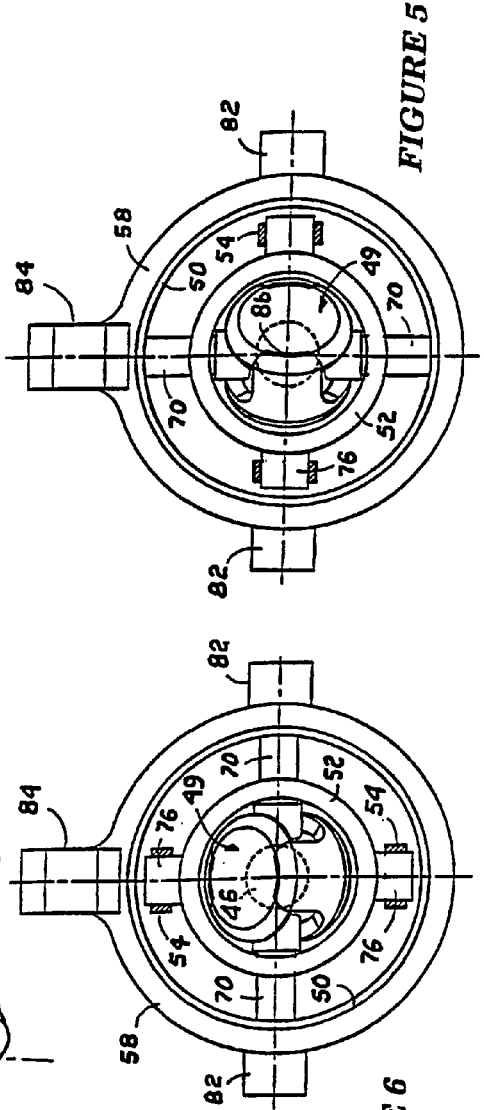
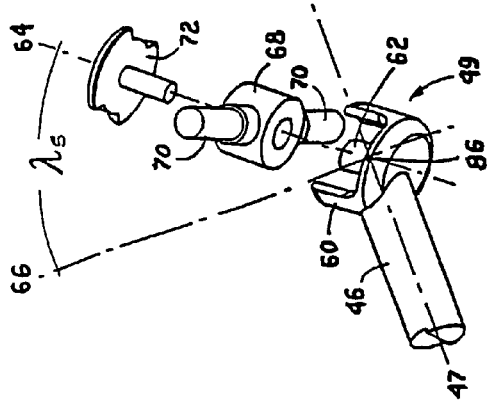
FIGURE 4
FIGURE 5
FIGURE 6

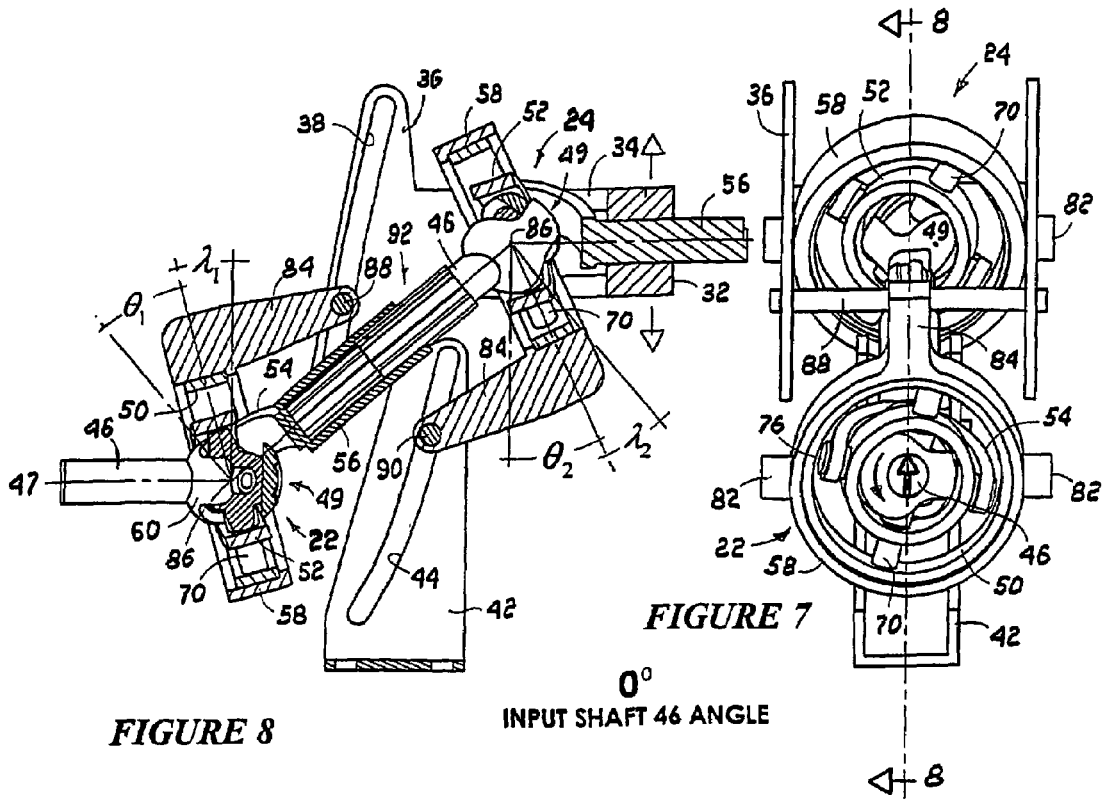
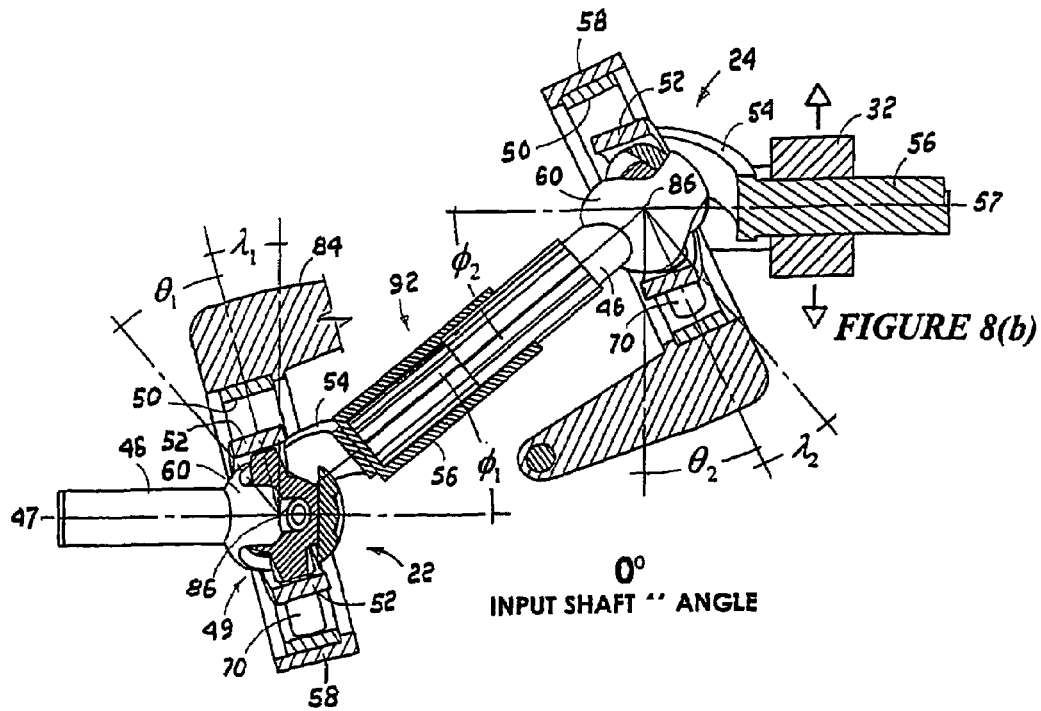

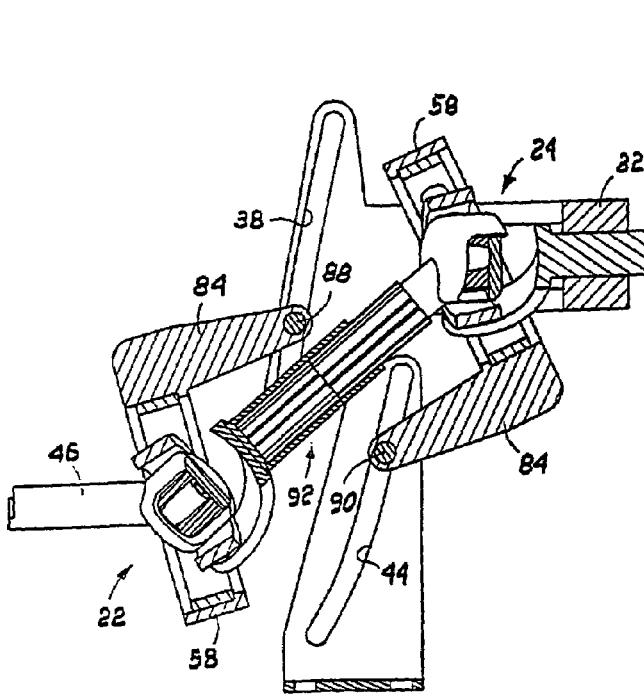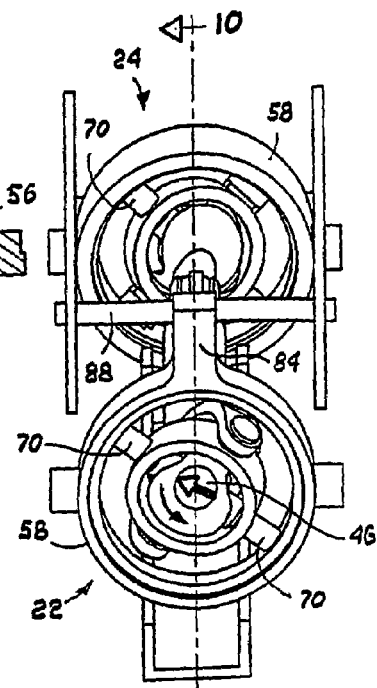
FIGURE 10  63°
INPUT SHAFT 46 ANGLE
*FIGURE 9*
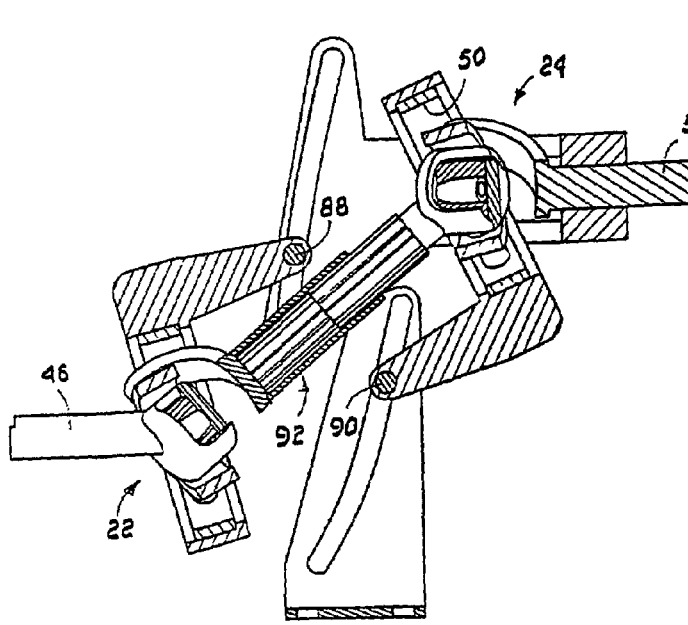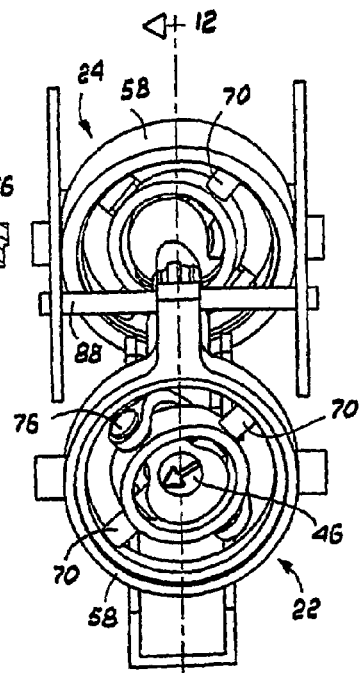
FIGURE 12  121°
INPUT SHAFT 46 ANGLE
*FIGURE 11*

*FIGURE 14*    273°
INPUT SHAFT 46 ANGLE

*FIGURE 16*    356°
INPUT SHAFT 46 ANGLE output of second angular velocity profile generator output of second angular velocity profile generator

ANGULAR VELOCITY PROFILE GENERATOR

FIELD OF THE INVENTION

This invention relates to an angular velocity profile generator which is adjustable to provide output angular velocity profiles to suit various machine drive applications and to a transmission machine including the angular velocity profile generator.

BACKGROUND TO THE INVENTION

Many infinitely variable transmission (IVT) machines have over the years been proposed and developed in attempts to produce, from a constant input velocity, an acceptable linear continuously variable output angular velocity and torque.

The basic approach to these machines has been initially to apply a single input angular velocity to a number of parallel stages of the machines which by means of angular velocity generators such as cams, slotted plates, linkages, off-centred sun gears, non-circular gears, orbital devices, universal joints and so on produced pulsed or cycled angular velocities (angular acceleration and deceleration cycles) in each of the stages which are appropriately phased to the input angular velocity. The pulsed or cycled angular velocities from the machine stages are then used to drive selective extraction devices, such as overrunning or sprag clutches and/or differentials which extract the maximum portions of the driven cycles of the parallel stages to provide modulated angular velocity outputs. These outputs are then recombined in an output stage of the machine to provide the output angular velocity of the machine. Examples of these machines are disclosed in the specifications of the following publications: WO82/02233, WO89/11604, WO90/01648, WO91/18225, WO94/11652, WO02/14715, FR916850A, U.S. Pat. No. 1,916,283A, U.S. Pat. No. 3,114,273, BE444789A and FR1071870A Common problems which are typically associated with IVT machines of the prior art are that:

they are capable of transmitting power in only one direction of rotation, which cannot be reversed, their cyclic angular velocity generating devices generate, in each parallel stage of the machine, a full cycle of a periodic motion on each revolution of their input shafts with their single drive direction overrunning clutch extraction devices being capable of clipping only the single maximum velocity peak from each cycle. The consequence of this is that the angular velocity output arrangements of the machines, such as planetary gear systems, are largely incapable of fully modulating the coarsely rippled output of the extraction devices to an acceptable purely or nearly so theoretically constant linear output velocity. The majority of the cyclic angular velocity generating devices which are employed in the IVT machines, and which include oscillating components such as the slotted plates, linkages which drive or are driven by off-centre gears, cams and the like suffer from balancing and other vibration problems which are principally caused mainly by shock loads generated by the direction changing mechanisms. The above are complex machines not suitable for practical implementation with the necessary level of reliability.

SUMMARY OF THE INVENTION

An angular velocity profile generator according to the invention comprises;

a first shaft, a second shaft, a universal joint in which the first and second shafts are joined to each other by pivot pins which lie on two axes which are fixed relatively to and intersect each other and the axes of the first and second shafts at a static point in the joint with the radially outer ends of the pivot pins on each of the pivot pin axes, in use, being rotatable in first and second circular paths about the static point, a first control arrangement for moving one of the shafts relatively to the other to vary the angular relationship between them at the universal joint, means in the universal joint which enables the path of rotation of the first universal joint pivot pin axis to be varied, in use, relatively to the path of rotation of the second pivot pin axis about the static point in the universal joint, and a second control arrangement, external to the universal joint, which is connected to the first pivot pin path varying means and is activated by the first control arrangement to cause, in use, as the first control arrangement is moved, the angular relationship between the first and second shafts and the first pivot pin path varying means to be adjusted in a predetermined relationship to achieve an output angular velocity profile to suit a specific application of the angular velocity profile generator.

The profile generator conveniently includes spaced formations which are fixed to the second shaft and with which the pivot pins of the second pivot pin axis are pivotally engaged, a support frame including spaced first and second frame members in each of which one of the profile generator shafts is journaled for rotation and the first control arrangement is means for moving one of the frame members relatively to the other to vary the angular relationship of the two shafts in a common plane.

The first pivot pin path varying means may include a housing which is pivotally mounted in the support frame for pivotal movement on an axis which is normal to and intersects, at the static point, the common plane in which the profile generator shafts are relatively movable to each other, a bore through the housing with the axis of the bore intersecting the static point and a circular path guide in the bore in which the ends of the pivot pins on the first universal joint pivot axis are engaged for rotation.

The pivot pin circular path guide may be a ring which is trapped in the housing bore for rotation only, relatively to the housing, about the housing axis with the ends of the pivot pins on the first universal joint pivot axis pivotally engaged in diametrically opposite formations on the ring.

In a preferred form of the profile generator of the invention the pivot pins on the first pivot pin axis are engaged with the first shaft by an arrangement which enables the pivot pins on the first pivot pin axis to oscillate during rotation of the first and second shafts, in use, in a path of rotation about the static point in the universal joint with the path of rotation of the pivot pins being fixed and angled relatively to the first shaft axis at a predetermined angle relatively to a line which is normal to the first shaft axis at the static point in the universal joint. The second control arrangement preferably includes a profiled ramp formation in the support frame and a ramp follower which is connected to the housing and is adapted to move over and follow the profile of the ramp formation to cause the path of rotation of the first pivot pin axis to be angularly varied relatively to that of the second pivot pin axis with the profile of the ramp formation and the position of the ramp follower on it, in use, determining the profile of the cyclic angular velocity output of the profile generator.

In one form of the invention the first pivot pin axis pivot pin engaging arrangement includes a second ring which is located in the first ring on a common centre at the static point with diametrically opposite pivot pins of the second pivot pin axis projecting from its outer surface to be pivotally located in the spaced formations on the second shaft, and the first pivot pin axis pivot pin first shaft connecting arrangement is a pivot shaft which is fixed to the first shaft with its axis passing through the static point in the universal joint and is angled at a predetermined angle relatively to a line, which passes through the static point, which is normal to the axis of the first shaft and a rotor on the pivot shaft which carries the pivot pins on the first pivot pin axis which is normal to the pivot shaft axis and passes through the static point in the universal joint.

In a second form of the invention the universal joint pivot pins are continuous pins which are fixed to each other in the form of a crucifix and the first universal joint axis pivot pin engaging arrangement includes two spaced arms which are fixed to the first shaft, an elongated slot in each of the arms with the longitudinal centres of the slots being situated in a common plane which includes the static point in the universal joint which is angled at a predetermined angle relatively to a line which passes through the static point and which is normal to the first shaft axis with the pivot pins on the first universal joint pivot axis passing through the slots with their ends pivotally located in apertures in the first ring.

Further according to the invention there is provided an infinitely variable transmission machine which comprises;
    an angular velocity input member,
    an angular velocity output member,
    a plurality of angular velocity transmission stages which each include a cyclic angular velocity generator,
    an input divider arrangement with which the angular velocity input member is engaged for applying the input angular velocity, in use, to the cyclic angular velocity generator in each of the transmission stages in a fixed ratio of rotation relatively to each other,
    an extraction device in each transmission stage which is driven by a cyclic angular velocity generating device in that stage to extract an absolute maximum angular velocity pulse section from the output of the angular velocity generating device during each revolution of the machine input member,
    an output collector arrangement which is adapted to sum the extracted outputs of each of the extraction devices in each of the transmission stages and to apply the summed extraction device outputs to the machine output member,
    preferably the cyclic angular velocity generating device in each transmission stage is the preferred form of the angular velocity profile generator with the first shaft of each of the profile generators being connected to the angular velocity input member of the machine through the input divider and their second shafts each engaged with an extraction device.

The preferred form of the profile generator may be the first form of the angular velocity profile generator of the invention.

Alternatively, the preferred form of the profile generator may, however, be the second form of the angular velocity profile generator of the invention.

The path of rotation of the pivot pins on the first universal joint pivot axis in each of the profile generators of the transmission machine may be angularly variable relatively to and include the second universal joint pivot axis and the second control arrangement may be adjusted to provide an angular velocity output profile which includes a section of linear angular velocity.

Each revolution of the machine input member may cause each profile generator to produce at the input to the extraction device of each transmission stage a single, substantially sinusoidal, angular velocity which includes the section of linear angular velocity with the number of transmission stages of the machine being dependent on the number of linear velocity section durations which are required together to provide a continuous linear velocity at the output member for each revolution of the machine input member.

Preferably each transmission stage includes two of the profile generators which are connected to each other in series with the second shaft of the first profile generator being connected to the first shaft of the second profile generator to provide an intermediate shaft between the two profile generators. Conveniently, one of the shafts of the intermediate shaft is linearly splined and the other includes a splined bore in which the splined portion of the splined shaft is telescopically slidable.

The transmission stages of the machine may be located in a common support frame with a first frame member carrying the input divider arrangement with which the first shafts of the first profile generators in each transmission stage are rotatably engaged and a second frame member which carries the extraction devices with which the second shafts of the second profile generators are engaged with the frame members being movable relatively to each other. The second frame member may be the first control arrangement of each of the profile generators in each transmission stage and is movable relatively to the first frame member.

In one form of the machine the transmission stages may be arranged in a side by side relationship in the common support frame with the first shafts of the first profile generators being journaled for rotation in the first frame member with the input divider comprising an input gear on each of the profile generator first shafts with the gears being meshed together in a 1:1 ratio of rotation with the angular position of each of the first profile generator shafts being rotatably phased from each other by the angular duration of the linear velocity output sections of the extraction devices. The second frame member may be the first control arrangement of the profile generators in each transmission stage and is vertically movable on a guide arrangement which is fixed to the common support frame with the extraction devices being fixed to the second frame member with the second shafts of each of the second profile generators passing through the second frame member to be engaged with an extraction device and the machine includes, means for moving the second support frame between a first position in which all of the shafts of the profile generators in a transmission stage are aligned and a second position on the guide arrangement in which the axis of the second shaft of the second profile generator of each transmission stage is parallel to and displaced from the axis of the first shaft of the first profile generator with all of the profile generator shafts in each transmission stage, in all positions of movement of the second frame member, being situated in a common plane.

The first pivot pin path varying means housing of each first profile generator in each transmission stage may include an arm which is fixed to and extends from the housing and operates in the plane including the axes of all of the shafts of the profile generator and carries on it the first profile generator ramp follower which follows the profile of a ramp formation which is attached to the second frame member as the second frame member is moved between its two positions of operation.

The first pivot pin path varying means housing of each second profile generator in each transmission stage may include an arm which extends from the housing and operates in a plane including all of the axes of the shafts of both profile generators with the ramp follower on it following the profile of a ramp formation which is fixed to the support frame as the second frame member is moved between its two positions of operation.

The angular velocity output collector comprises an output gear which is attached to and index rotated once by a transmission stage extraction device during each revolution of the machine input member with the output gears being meshed with one another so that sequentially phased indexed rotation of the gears by the extraction devices will together provide a continuously linear output velocity at the machine output member for each single rotation of the machine input member.

The extraction devices may each be a one-way clutch such as a sprag clutch or the like. Preferably, the output gear of each transmission stage is an externally toothed outer race of the one-way clutch.

The extraction devices may, however, each include a first clutch plate, a second clutch plate which is fixed to the machine output gear which it index rotates and an actuator which is engaged with the second shaft of the second profile generator in the transmission stage which is connected to the extraction device for moving the clutch plates on the common axis between a first position in which they are disengaged from each other to a second position in which they are engaged with one another to index drive the second clutch plate and so the transmission stage output gear. The clutch plates are conveniently rings of dog clutch teeth with the second clutch ring being fixed to a side of the output gear, which is continuously rotated, in use, in the machine output collector, with the first ring being movable towards and away from the second ring by the actuator against and with the bias of a biasing spring between the clutch plates.

Each extracting device actuator may include a synchronisation arrangement which, in use, is slidably located on and continuously rotated by the second profile generator second shaft and which on movement by the actuator of the first clutch, ring towards its second position of movement synchronously aligns the dog clutch teeth of the two clutch rings, prior to engagement, for perfect mesh of the dog teeth of the independently rotating clutch plate rings. The actuator of the extraction device of each transmission stage may include a cam arrangement which includes fixed and rotatable lobed annular cam members which surround and are free of the second shaft of the second profile generator, a drive ring for rotating the rotatable cam members with lobes on the fixed cam member acting on lobes on the rotatable cam members to cause, in use, the first clutch ring to be moved by the rotatable cam members from its first to its second position of movement for a fractional period of rotation of the second shaft of the second profile generator of each transmission stage.

The drive rings of the extraction device in each of the transmission stages are meshed together for concomitant rotation and the machine includes a drive arrangement for driving the coupled drive rings directly from the machine input divider.

The embodiment of the transmission machine wherein the extraction devices are one-way clutches could include an arrangement for reversing the direction of rotation of the output shaft of the machine including a driven gear which is engaged with and driven by the machine output collector gears, a ratio varying planetary gear arrangement, a suitable transmission arrangement which is driven by the drive gear to drive a drive gear which in turn drives the first sun gear of the planetary system with the second sun gear being driven by an extended machine input shaft while the cage of the planetary system is connected to the machine output member. The same arrangement could be employed to extend the ratio range of the machine.

BRIEF DESCRIPTION OF THE DRAWINGS

An embodiment of the invention, as adjusted for producing a linear output angular velocity, is now described by way of example only with reference to the drawings in which:

FIG. 4 is an exploded perspective view of one embodiment of the angular velocity profile generators of the invention as used in the transmission stage of the machine of FIGS. 2 and 3, FIGS. 5 and 6 are illustrative end views of the assembled components of the angular velocity profile generator of FIG. 4, shown at angles of 180° and 90° respectively of the transmission stage input shaft, FIG. 7 is an end elevation of the two angular velocity profile generators of the transmission stage of FIGS. 2 and 3 shown at an input angle of rotation of 0° of the input shaft of the transmission stage, FIG. 8 is a side elevation of the two angular velocity profile generators of FIG. 7 shown sectioned on the 8—8 in FIG. 7, FIG. 8(*b*) is, for clarity, an enlargement of the profile generators of FIG. 8, FIGS. 9 to 16 are alternately end and sectioned side elevations of the FIGS. 7 and 8 angular velocity profile generators with each pair of drawings illustrating the arrangement of the components of the angular velocity profile generators of the transmission stage at input shaft angles of rotation of 63°, 121°, 273° and 356° respectively during one revolution of the input shaft of the machine.

DETAILED DESCRIPTION OF THE PREFERRED EMBODIMENT

Figure 1:
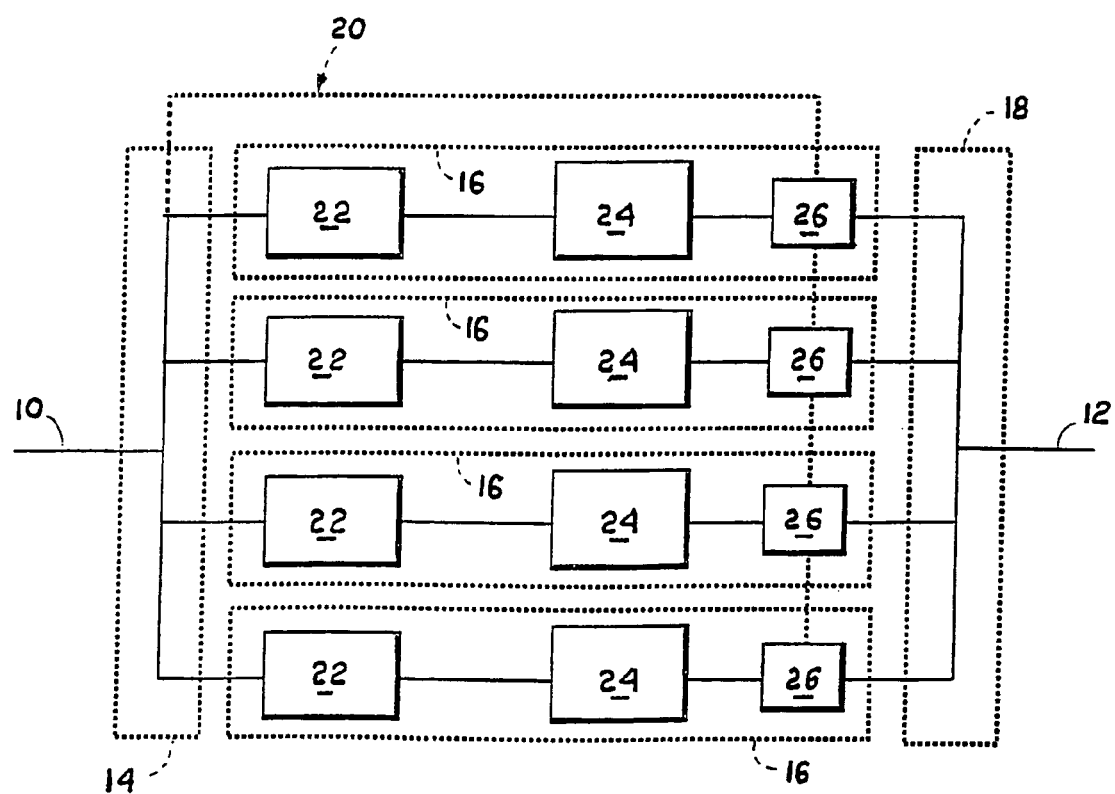
FIG. 1 is a block diagram of the IVT machine of the invention.

The IVT machine of the invention is shown in FIG. 1 to include an angular velocity input shaft 10, an angular velocity output shaft 12, an angular velocity input divider 14, four parallel identical angular velocity transmission stages 16, an angular velocity output collector 18 which drives the output shaft 12 and a drive synchronisation arrangement 20.

Each of the four angular velocity transmission stages 16 includes coupled profile generators 22 and 24 of the invention and an angular velocity extraction device 26 the outputs of which are fed to the output shaft 12 through the output collector 18.

Figure 2:
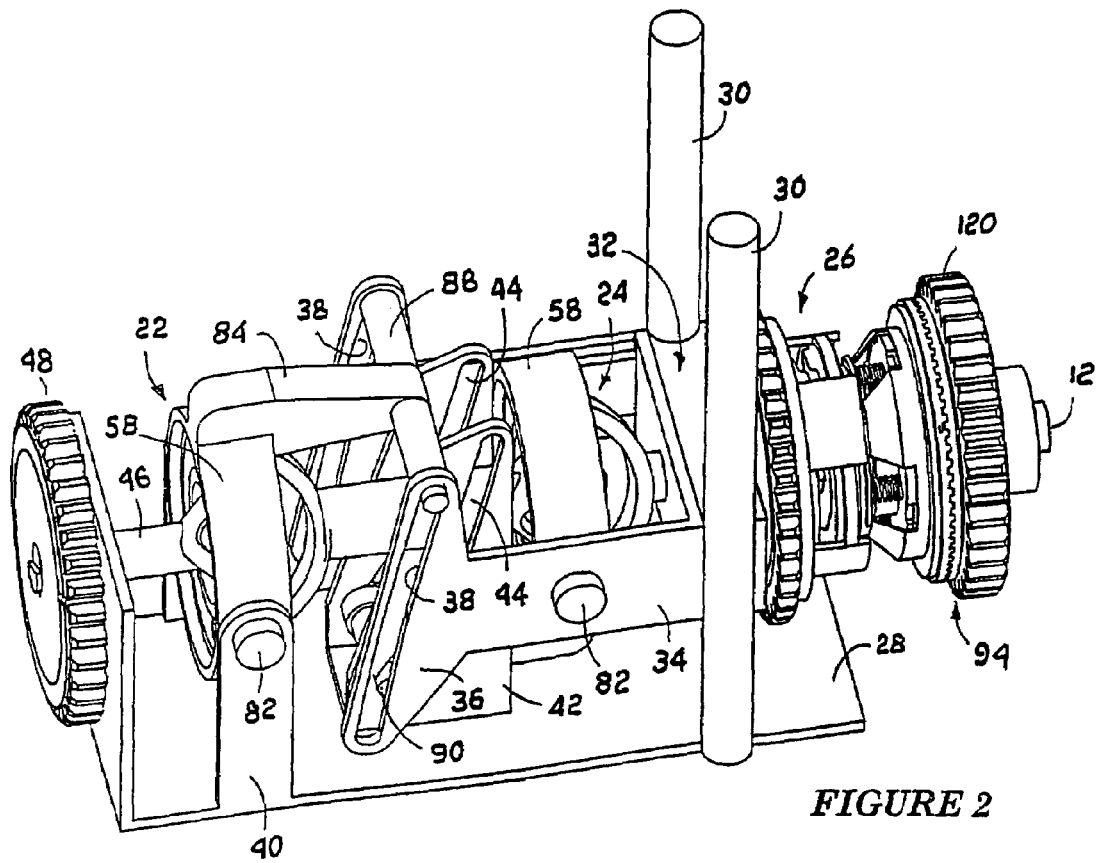
FIG. 2 is a perspective view of one of the angular velocity transmission stages of the IVT machine of the invention in its low range configuration.
Figure 3:
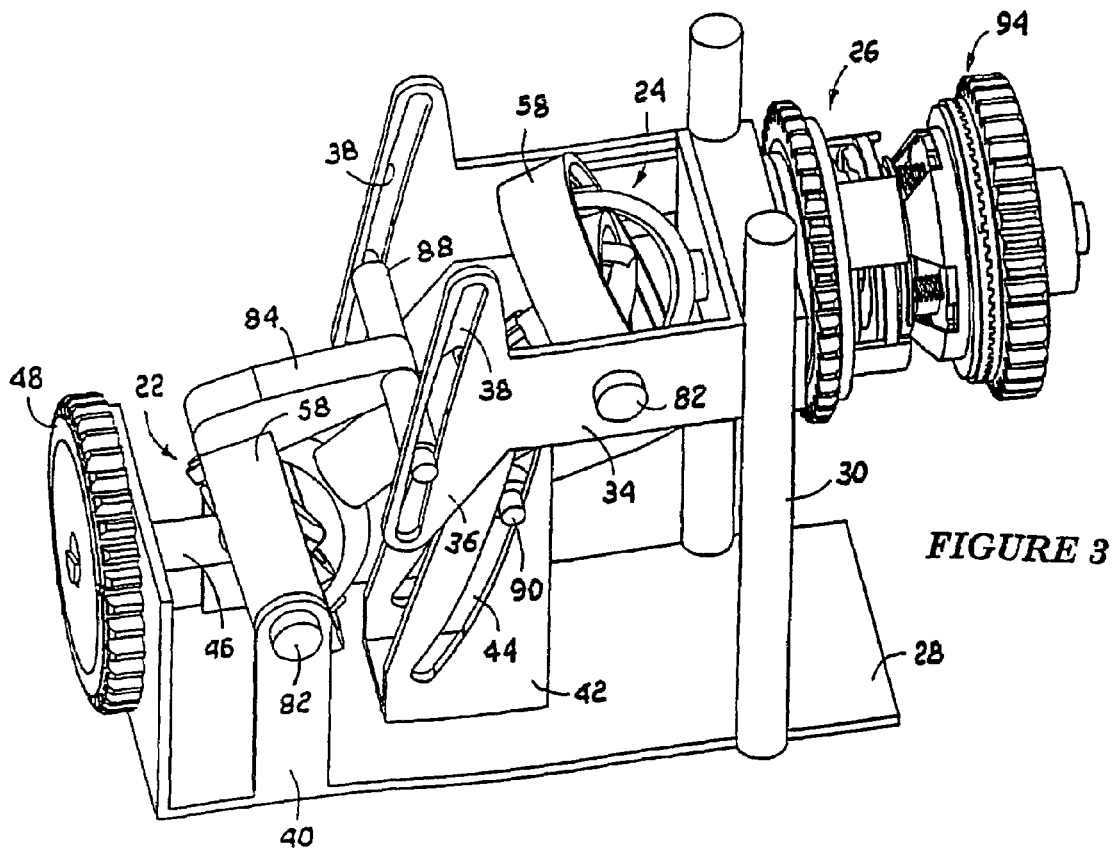
FIG. 3 is a perspective view of the FIG. 2 transmission stage in its high range configuration.

FIG. 2 illustrates one of the four identical transmission stages 16 of the invention in its low range configuration and, in FIG. 3, in its high range configuration.

The transmission stage 16 of FIGS. 2 and 3 includes a support frame 28 which carries two vertical guide rails 30 with which a U-shape slide frame 32 is engaged and is upwardly and downwardly slidable in a vertical direction. The profile generator 24 is pivotally mounted between two side frame arms 34 of the slide frame with the free ends of the arms being formed into transversely projecting end members 36 which each carry an elongated and slightly arcuate angle regulating slot 38 for the profile generator 22. The support frame 28 additionally carries two upright support arms 40 in which the profile generator 22 is pivotally mounted and a frame element 42 which includes two upwardly directed arms which each include an arcuate angle regulating slot 44 for the profile generator 24. The forward end of the support frame 28 carries an upwardly directed flange in which the input shaft 46 of the profile generator 22 is journaled for rotation and carries on its end, on the outside of the support frame 28, a drive gear 48.

The angular velocity profile generators 22 and 24 in the transmission stage are identical and are shown in FIGS. 4, 5 and 6 to include a drive shaft 46, a swivel arrangement 49, a gimbal type arrangement which comprises gimbal rings 50 and 52, a yoke 54 which carries an output shaft 56 and an angle adjuster ring 58.

The swivel arrangement 49 is fixed to an end of the drive shaft 46 and includes a housing 60 which is cup-shaped and carries an axially located pivot pin 62 which projects upwardly from the centre of the base of the cup with its axis 64 at an angle $\lambda_s$ relatively to an axis 66 which is normal to the axis 47 of rotation of the drive shaft 46, a rotor 68 which is rotatable about the pivot pin 62 and includes diametrically opposite trunnion pins 70. The sides of the swivel housing 60 are cut away to provide space for free oscillatory movement of the trunnion pins 70 about the pivot pin 62 axis 64. The housing includes a cap 72 for trapping the rotor 68 in the housing.

The gimbal ring 50 includes diametrically opposite trunnion holes 74, the ring 52 includes diametrically opposite trunnions 76 and trunnion holes 78 with the trunnion and hole axes being at an angle δ to each other. The gimbal yoke 54 includes trunnion holes 80. The adjuster ring 58 carries trunnions 82 with their axis 83 being normal to and intersecting a plane which passes centrally through the length of a control lever 84 which is made integral with the ring 58. The ring 58 additionally includes an inner diametrical recess in which the gimbal ring 50 is located to be rotatable about its axis but is held by the recess against other movement relatively to the angle adjuster ring 58.

The profile generator is shown assembled in the FIGS. 5 and 6 end elevations as seen from the right in FIG. 4. In the assembled unit the trunnion pins 70 of the swivel rotor 68 are located in and pass through the trunnion holes 78 of the gimbal ring 52 with their ends located in the holes 74 of the ring 50. The ends of the swivel trunnion pins 70 do not project beyond the outer surface of the gimbal ring 50 so as not to interfere with rotation of the ring 50 in the recess in the angle adjuster ring 58. The axes of all of the trunnions and the trunnion holes in the components of the profile generator as well as the axes of the input and output shafts 46 and 56 respectively pass at all times, during operation of the profile generator, through a common point 86, shown in FIGS. 4, 5 and 8(b), in the housing 60 of the swivel arrangement 49.

In FIGS. 7 and 8 the two profile generators 22 and 24 are shown located in the framework of the transmission stage with the control arm 84 of the profile generator 22 engaged, by means of a transverse control shaft 88, with the opposed slots 38 in the sliding frame 32 extensions 36. The control arm 84 of the profile generator 24 is similarly engaged by means of a shaft 90 in the arcuate slots 44 of the support frame member 42. The input shaft 46 of the profile generator 24 is splined, as shown in FIG. 8, and the output shaft 56 of the profile generator 22 is tubular and internally splined with the two shafts being telescopically engaged to provide a composite intermediate connecting shaft 92 between the two angular velocity profile generators.

With the profile generators 22 and 24 of FIG. 8 assembled in the transmission stage framework of FIG. 3 the arrangement is such that the axis of the angle adjuster trunnions 82 of both profile generators are parallel. The axis of the input shaft 46 of the profile generator 22 and the axis of the output shaft 56 of the profile generator 24 are parallel and lie in the same plane with this plane, as mentioned above, being perpendicular to the axis of the angle adjuster ring 58 trunnions 82. The operating angles $\phi$, as seen in FIG. 8(b), for both angular velocity profile generators are variable but always equal, in this embodiment of the invention. The angle $\theta$ is measured between the normal of the output shaft 56 axis 57 and the plane in which the angle adjuster ring 58 operates. The angle $\lambda$ is measured between the normal of the input shaft 46 axis 47 and the plane in which the angle adjuster ring 58 operates and in which, in this embodiment of the invention, always includes the axis 83 of the adjuster ring 58 trunnions 82. It follows from FIG. 8(b) that the operating angle $\phi$, the angle between the input shaft 46 axis 47 and the output shaft 56 axis 57, has the following relationship $\phi=\theta+\lambda$ for both profile generators.

The regulation of $\theta_1$ and $\lambda_1$ for the profile generator 22 is accomplished by the control arm 84 of the profile generator 22 moving its shaft 88 in the slot 38 of the sliding frame with the curvature of the slot 38 being such as to ensure the correct values of $\theta_1$ and $\lambda_1$ for the profile generator 22 as the sliding frame 32 is moved upwardly or downwardly on the guide rails 30 of the transmission stage framework.

The regulation of $\theta_2$ and $\lambda_2$ of the profile generator 24 is achieved by its control arm 84 moving the shaft 90 in the slot 44 in the frame member 42. The curvature of the slot 44 is such as to ensure the correct values of $\theta_2$ and $\lambda_2$ for the profile generator 24 as the sliding frame is moved upwardly or downwardly on the guide rails 30. The angle $\beta$, not shown in the drawings, between the axis 81 of trunnion holes 80 of gimbal yoke 54 of the connecting shaft 92 and the plane in which $\lambda_s$ of the input shaft 46, of the profile generator 24, is measured, may be 0°.

The various components of the two profile generators 22 and 24 in FIGS. 7 and 8 are shown with an input shaft 46 angle of rotation in an anticlockwise direction of rotation about its axis of 0°. In FIGS. 9 and 10 the components are shown at an input shaft angle of 63°. In FIGS. 11 and 12 the components are shown with the input shaft angle at 121.

Figure 13:
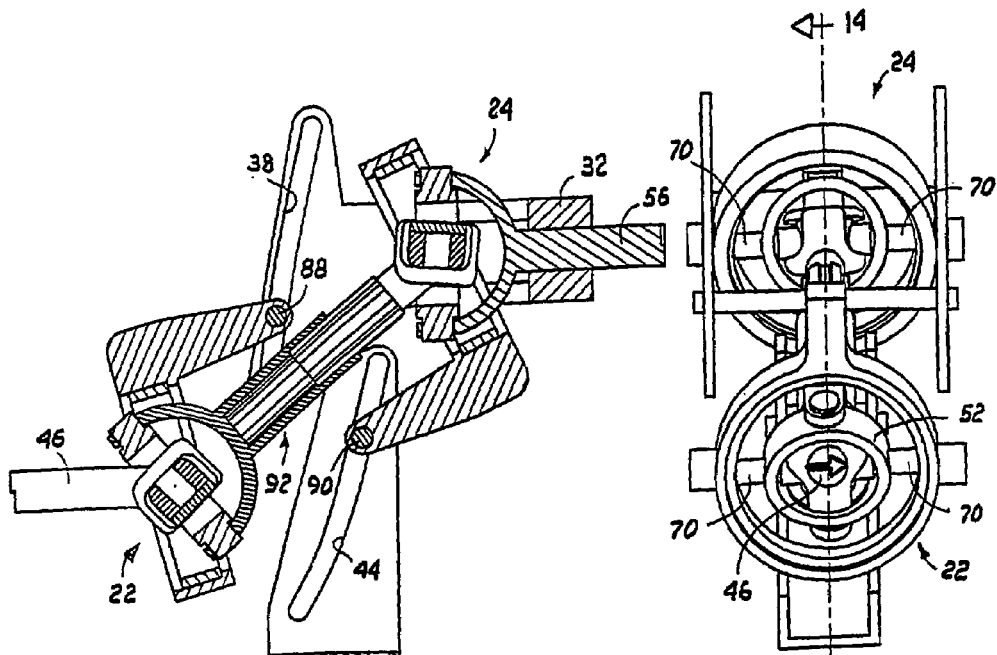
Figure 15:
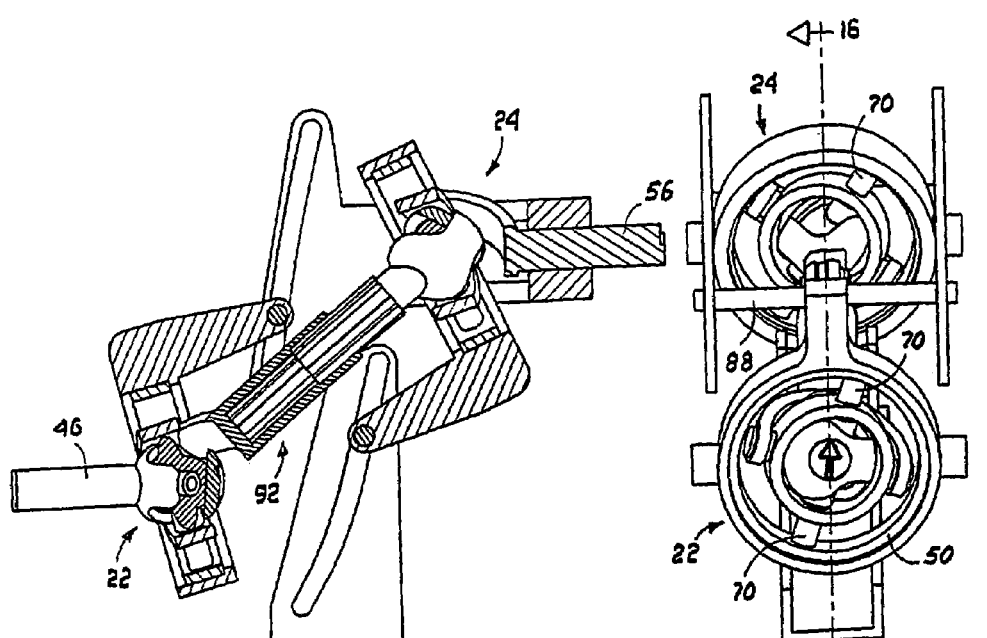

In FIGS. 13 and 14 the input shaft angle is 273° and in FIGS. 15 and 16 the angle is 356°. The drive shaft input angles of each pair of drawings is indicated approximately by the arrow on the input shaft 46 of the end elevations. The relevance of these input shaft angles will become apparent from the graph of FIG. 17.

Figure 17:
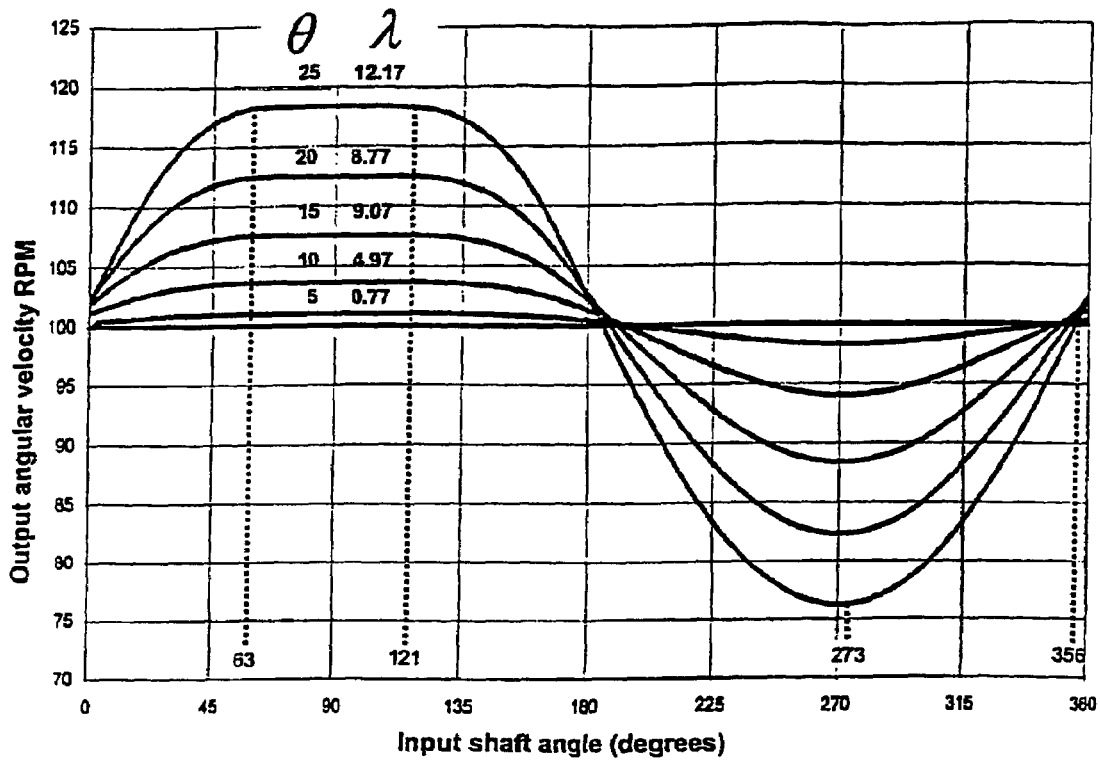
FIG. 17 is a graph illustrating examples of angular velocity profiles of the two angular velocity profile generators of FIGS. 7 and 8 and FIGS. 9 to 16 as measured between the two angular velocity profile generators at the input shaft angles indicated by the dotted lines on the graph.

FIG. 17 illustrates typical angular velocity output profiles for only the profile generator 22 parameter values of $\theta_1$ and $\lambda_1$ as indicated on the graph. The illustrated angular velocity output profiles of the profile generator 22 are typically measured between the two profile generators 22 and 24 and are generated with a common input velocity of the input shaft 46 of 100 rpm. In all cases $\lambda_s$ is equal to 45°. The fundamentally important component of the graph illustrated in FIG. 17 is the linear angular velocity portion of the positive curves between the input shaft 46 angles of rotation of 63° and 121° as illustrated in FIGS. 9 and 10 and 11 and 12.

Figure 18:
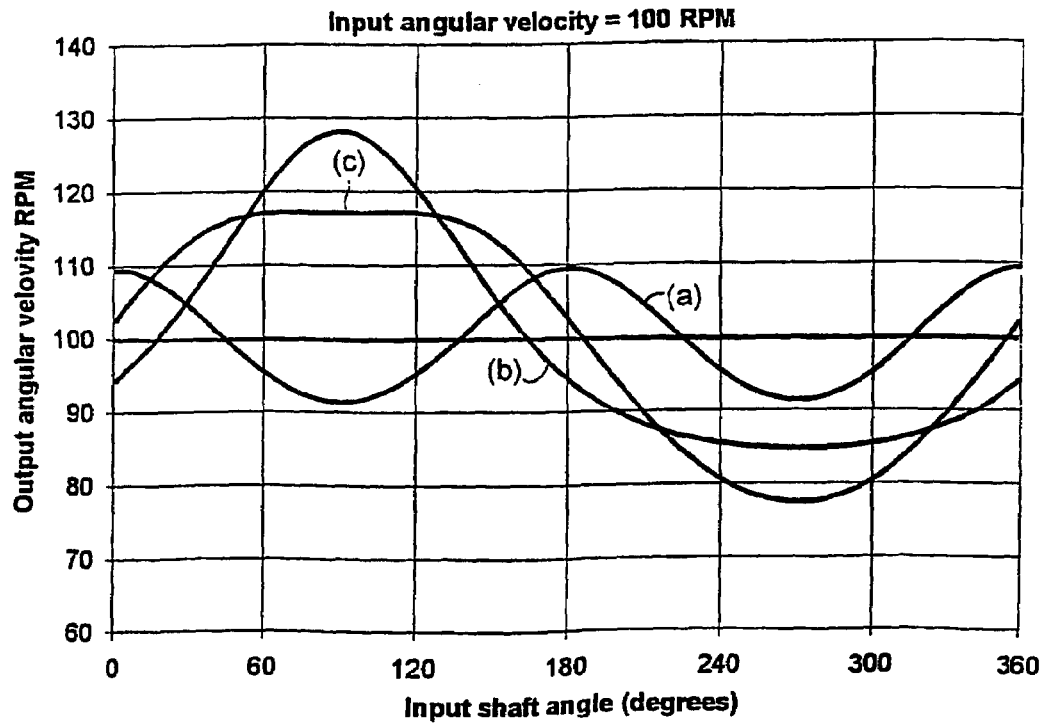
FIG. 18 is an illustrative set of graphs used in explaining the derivation of the angular velocity profile of the output of the angular velocity profile generators of FIGS. 7 to 16.

The derivation of the linear velocity of the angular velocity curves of a single angular velocity profile generator 22 or 24 of FIG. 17 is explained with reference to FIG. 18. In FIG. 18 if $\lambda=0$ (the front face of the angle adjuster ring 58 is normal to the input shaft 46 axis) and $\phi=\theta$ ($\phi=\theta+\lambda$) the gimbal arrangement will operate as an ordinary universal joint with two identical angular velocity cycles (a) per revolution of the input shaft, as is characteristic of a conventional universal joint, and the amplitude of the angular velocity profile will depend on $\theta$. In this case the swivel arrangement 49, although rotating, will be otherwise stationary with respect to the swivel axis 64 and the value of $\lambda_s$ (the angle between the normal of the input shaft 46 axis 47 and the axis of the swivel arrangement pivot pin 62) will have no effect on the output angular velocity profile of the output shaft 56 of the profile generator provided $0°\leq\lambda_s\leq180°$.

If the adjuster ring 58 is rotated about its pivot axis 83 such that its front face is normal to the output shaft 56 axis 57 (FIG. 4) then $\theta=0°$ and thus $\phi=\lambda$ and here the gimbal rings 50 and 52 will, except for rotation, be stationary with respect to output shaft 56 while the input shaft 46 is rotated with the effect of the gimbal arrangement being cancelled (as is the case where the input and output shafts of a conventional universal joint are aligned). In this case, however, the swivel will not be stationary with respect to the swivel axis 64 and the trunnion pins 70 will oscillate with the degree of oscillation being a function of $\lambda$ and $\lambda_s$ and the resulting angular velocity output profile will include only one cycle (b) for each revolution.

When non-zero values of $\theta$ and $\lambda$ exist the values may be chosen so that the combined effect will include a constant angular velocity section (c) (see FIG. 18).

From the above it is seen that this invention relies on the fact that for certain combinations of the variables for a single profile generator or n profile generators in series, the variables $(\theta_1,\lambda_1,\lambda_{s1},\theta_2,\lambda_2,\lambda_{s2},\beta_1,\delta_1 \ldots \theta_{n-1},\lambda_{n-1},\lambda_{s(n-1)},\theta_n,\lambda_n, \lambda_{s(n)},\beta_{n-1},\delta_{n-1})$ can be chosen (by suitable configuration of the slots 38 and 44 and positioning of the angle adjuster rings 58) to produce a perfect constant angular velocity section. It is to be noted that FIG. 18 and its explanation is given here only as an example to illustrate the operation of the angular velocity profile generators in the IVT transmission machine of the invention.

Figure 19:
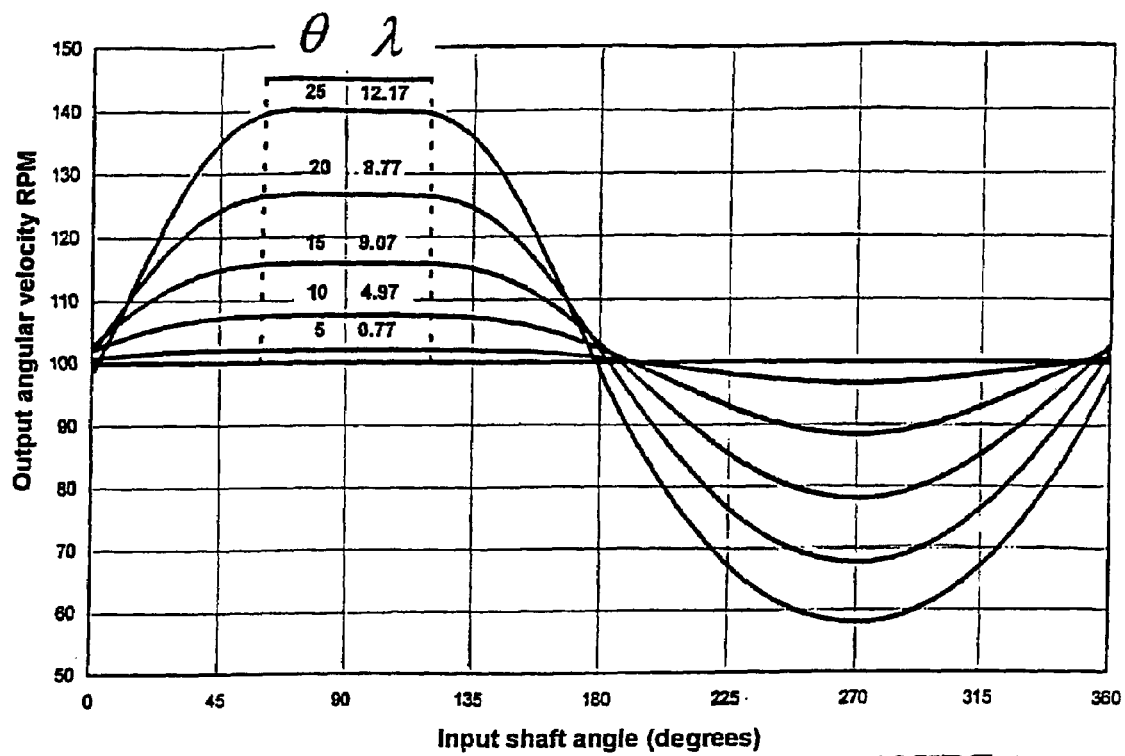
FIG. 19 is a graph of the combined angular velocity profiles of two angular velocity profile generators as measured at their output shaft.

FIG. 19 illustrates the angular velocity profiles of the two profile generators 22 and 24 which are connected in series as illustrated in FIGS. 7 to 16. The profiles of the graphs of FIG. 19 represent the combined superimposed profiles of the profile generators 22 and 24 as measured at the output shaft 56 of the profile generator 24. In the graphs of FIGS. 17 and 19 the $\theta$ and $\lambda$ angles are the same while $\lambda_s$ remains 45° in all cases. FIG. 19 also indicates the duration, between the dotted lines, for which the output angular velocity is constant while employing different values of $\theta$ and $\lambda$. The same values for $\theta$ and $\lambda$ are used in FIGS. 17 and 19 for the first and second angular profile generators respectively with $\lambda_s=45°$, $\delta=90°$ and $\beta=0°$.

Figure 20:
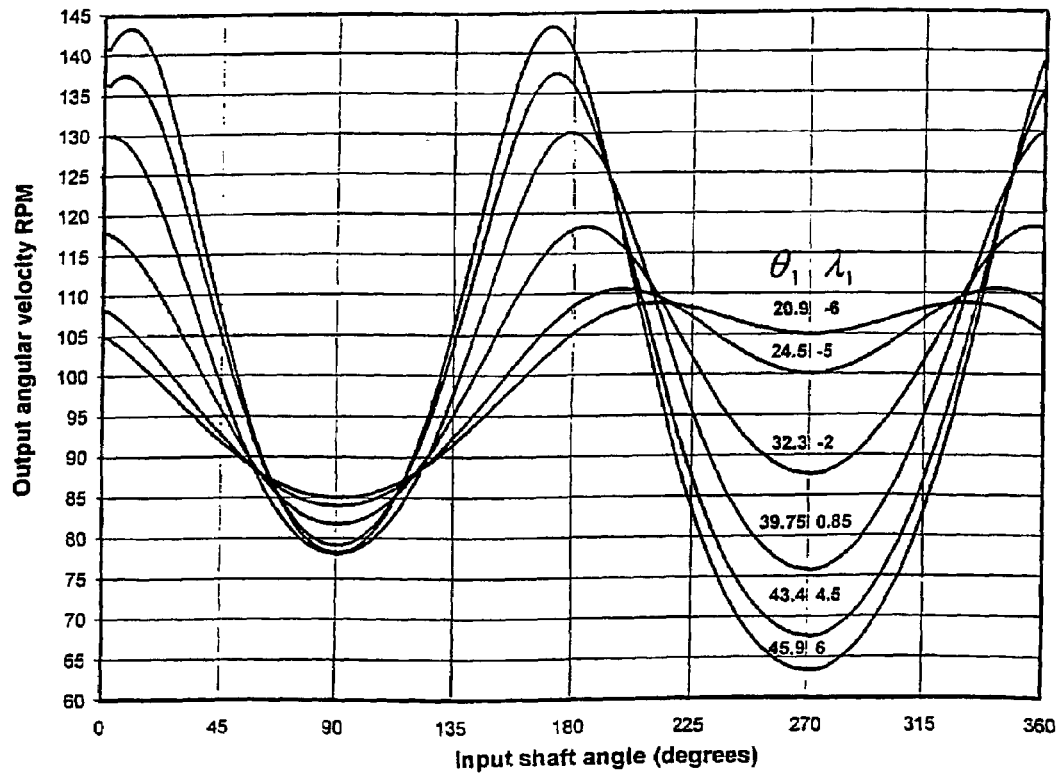
FIG. 20 is a graph illustrating the output angular velocity of the angular velocity profile generator which is connected to the input shaft of the machine of FIGS. 2 and 3.
Figure 21:
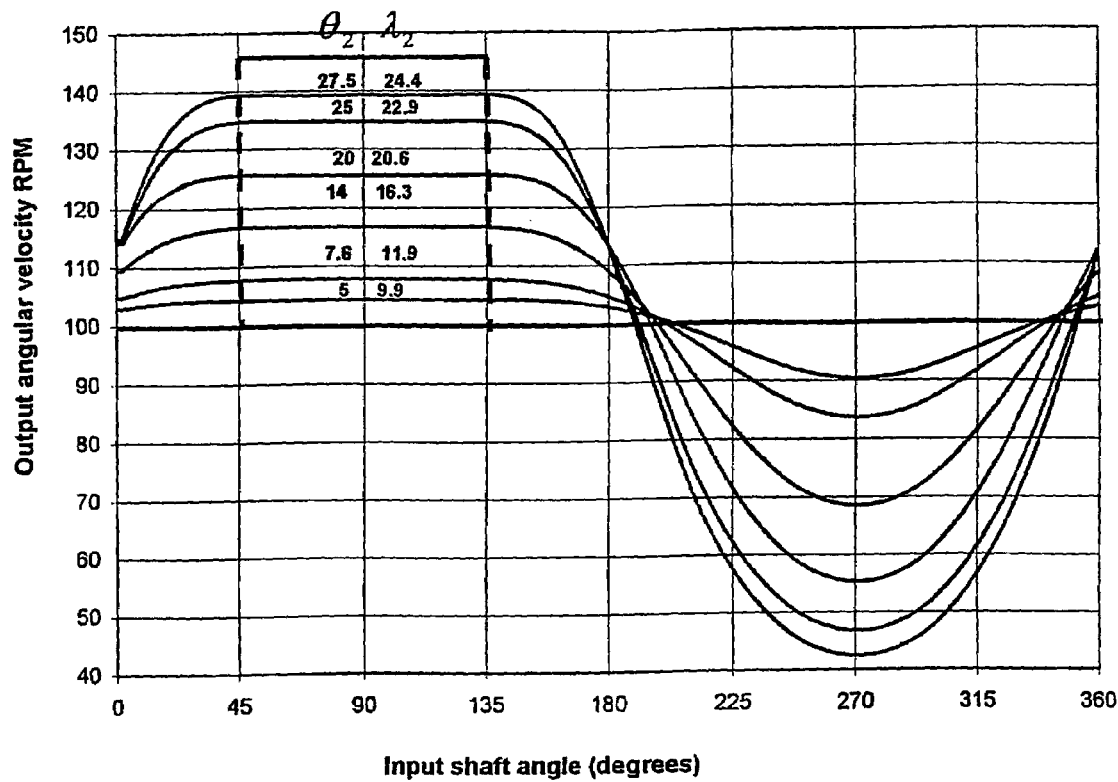
FIG. 21 is a graph illustrating the combined output of the two angular velocity profile generators.
Figure 22:
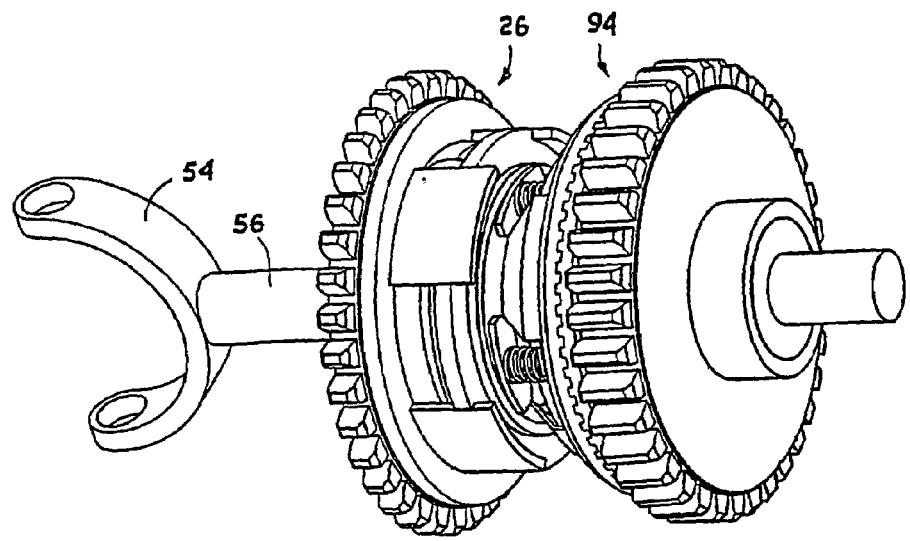
FIG. 22 is a perspective view of the angular velocity extraction device of the invention.

In the graphs of FIGS. 20 and 21 angles for θ and λ are different for each of the profile generators 22 and 24. The operating angles φ for both profile generators are the same. In FIG. 20 it is seen that the intermediate velocity profile (existing between the profile generators 22 and 24) does not contain a section of constant angular velocity but when combined with the angular velocity of the profile generator 24 produces a 90° constant ripple free angular velocity section which is indicated between the dotted lines in FIG. 21. In all cases $\lambda_s=45°$, $\beta=0°$ and $\delta=90°$. FIGS. 17, 19, 20 and 21 serve only as examples of some combinations of θ, λ, $\lambda_s$, δ and β for the various profile generators to produce an output angular velocity containing a constant angular velocity section. The angular velocity profile generators of this invention are, however, not limited to the above examples only but may include any suitable combinations of the above angles to satisfy a specific output angular velocity profile which may be required in applications other than the linear angular velocity output profile of the IVT machine of this invention.

The output unit 94 and extraction device 26 of each transmission stage 16, in this embodiment of the invention, are combined in a single unit, as shown in FIGS. 22 to 27, and includes: an input shaft 56, an output unit 94, an axial displacer 96, a synchronisation unit 98, a compression spring 100, a second coil spring 102, an inner coupling hub 104, an outer coupling hub 106, an outer cam unit 108, an inner cam unit 110, a cam profile unit 112, a cam driver 114, four hub springs 116 and four displacer springs 118 which are attached to the axial displacer 96.

Figure 23:
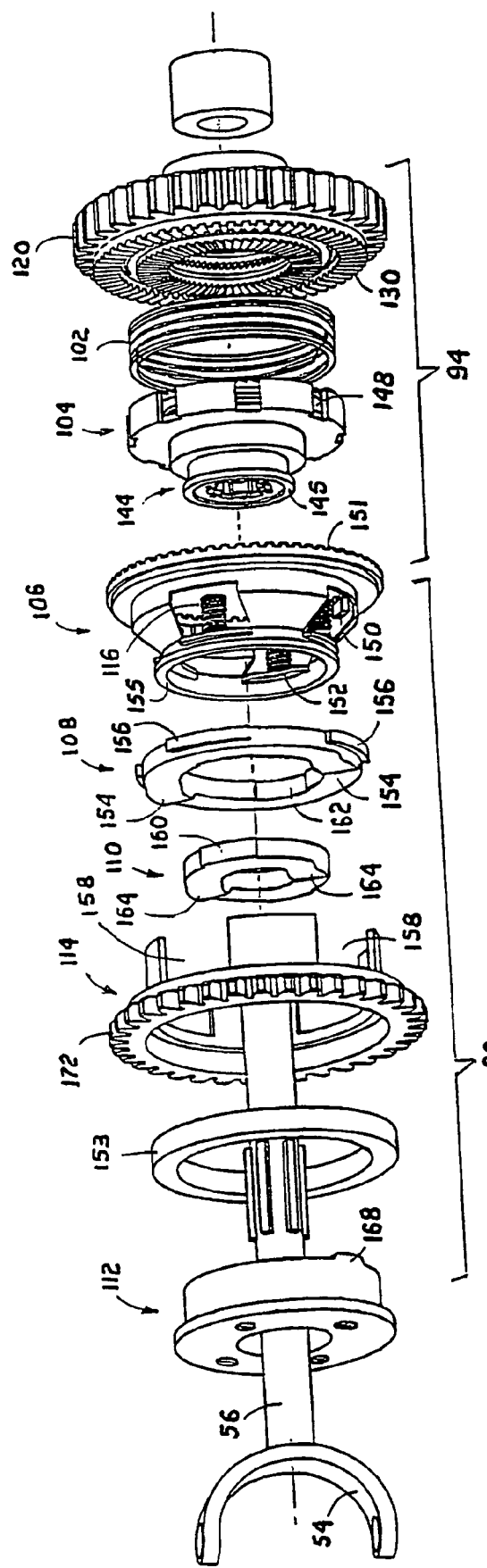
FIG. 23 is an exploded perspective view of the output unit and extraction device of FIG. 22.
Figure 24:
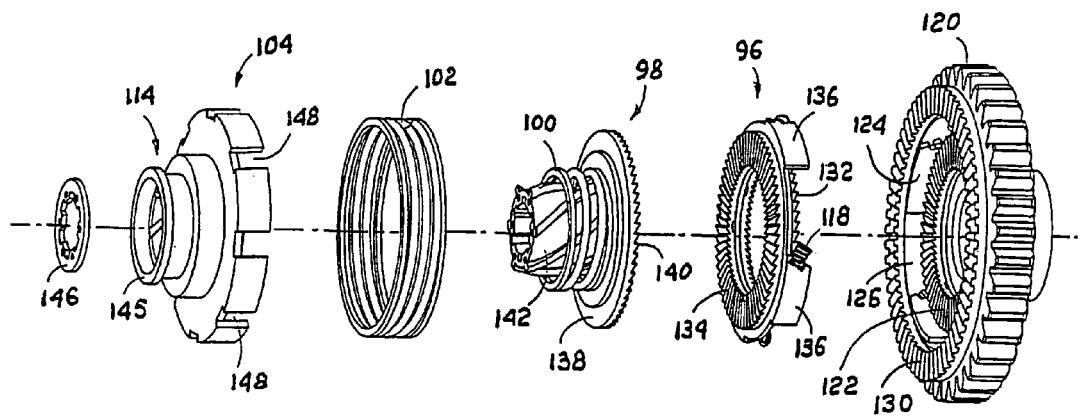
FIG. 24 is an exploded perspective view of the output unit.

The output unit 94, as shown in FIGS. 23 and 24, includes an output gear 120 of the transmission stage 16 of FIGS. 2 and 3, and in a recess in the rear face of the gear, an annular serrated tooth synchronisation plate 122 and four radial positioning devices 124. The synchronisation plate 122 and the radial positioning devices 124 are integral with the gear 120, as is most clearly seen in FIGS. 24 and 27.

The radial positioning devices 124 in the output gear 120 are circumferentially spaced on the wall of the recess in the gear to provide slots 126 between them.

The gear 120 additionally includes a rearwardly facing integral ring 130 of dog clutch teeth.

Figure 25:
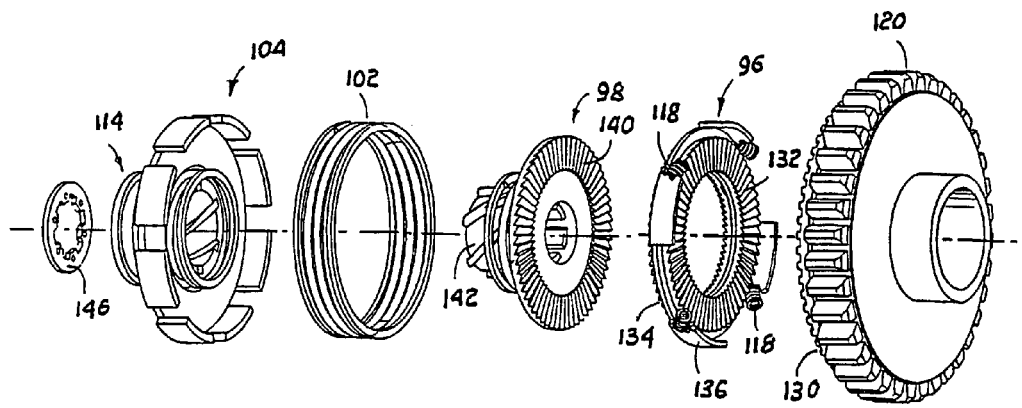
FIG. 25 is an exploded perspective view of the output unit of FIG. 24 as seen from the opposite side to that illustrated in FIG. 24.

The axial displacer 96 is essentially a disc which carries on its forward face an annular ring 132, see FIG. 25, of oppositely directed serrated teeth to those of the synchronisation plate 122 in the output gear 120. The toothed ring 132 has the same radial dimensions as the synchronisation plate 122. The axial displacer disc 96 additionally carries a second annular serrated tooth ring 134 and four forwardly projecting rim portions 136.

The rim portions 136 of the axial displacer 96 are engageable in the slots 126 in the output gear 120 and are dimensioned to permit limited rotation of the displacer relatively to the output gear. One edge of each of the positioning devices 124 in the output gear 120 and the axial displacer 96 rim portions 136 are suitably profiled to engage the displacer springs 118 between them in the assembled unit. The circumferential dimensions of the slots 126 and the displacer rim portions 136 in fact limited the degree of spring 118 loaded relative rotation of the output gear and the axial displacer to less than the width of one tooth on either of the toothed rings.

The synchroniser unit 98 includes an annular ring plate 138 which has an outer diameter equal to that of the toothed ring 134, as shown in FIG. 24, and carries on its front face, as is most clearly seen in FIG. 25, a ring 140 of serrated teeth which are oppositely shaped to and have the same pitch as those of the toothed ring 134 on the axial displacer 96.

The radially extending serrated teeth on the toothed rings 122, 132, 134 and 140 are, as shown in FIGS. 23 to 25, saw tooth shaped in cross-section.

A bendix-like helically splined sleeve 142 is integral with and projects from the rear face of the synchroniser unit 98. The sleeve bore is linearly splined to receive the splines on the output shaft 56 extension piece to enable the synchroniser unit 98 to be slidable on the shaft in its axial direction, in use. The outer surface of the sleeve 142 carries helical male splines which are slidably engaged with complementally helixed female splines in a bore in a boss 114 on the rear of the inner coupling hub 104 and a rearwardly facing pressure ring 145.

In the assembly of the synchronisation unit 98 and the coupling hub 104, the spring 100 is located over the spline sleeve 142, as shown in FIGS. 24 and 25, and the male splines on the splined sleeve 142 of the synchronisation unit 98 are engaged with the female splines in the boss 144 of the coupling hub 104. The spring 100 is then compressed and a splined locking disc 146 is attached by screws (not shown) to the rear of the sleeve 142 of the synchronisation unit to be located in a recess in the rear of the coupling unit 104 boss 114 to hold the units 98 and 104 together with the spring 100 tensioned between them to bias the two components apart in their axial direction.

The forwardly directed skirt of the coupling hub 104 is castellated by circumferentially spaced slots 148 which, in the assembled output unit 94, are slidably engaged with rectangular keying formations 150, see FIG. 23, in the outer coupling hub 106 to enable the inner coupling hub 104 to be slidable in an axial direction on the splines of the profile generator 24 output shaft 56 relatively to the outer coupling hub 106 while being rotated by means of the keying formations 150 in the hub 106, in use.

The outer coupling hub 106 carries a ring of dog clutch teeth 151 which are complementally shaped to and engageable with those on the ring 130 of the output gear 120.

Figure 27:
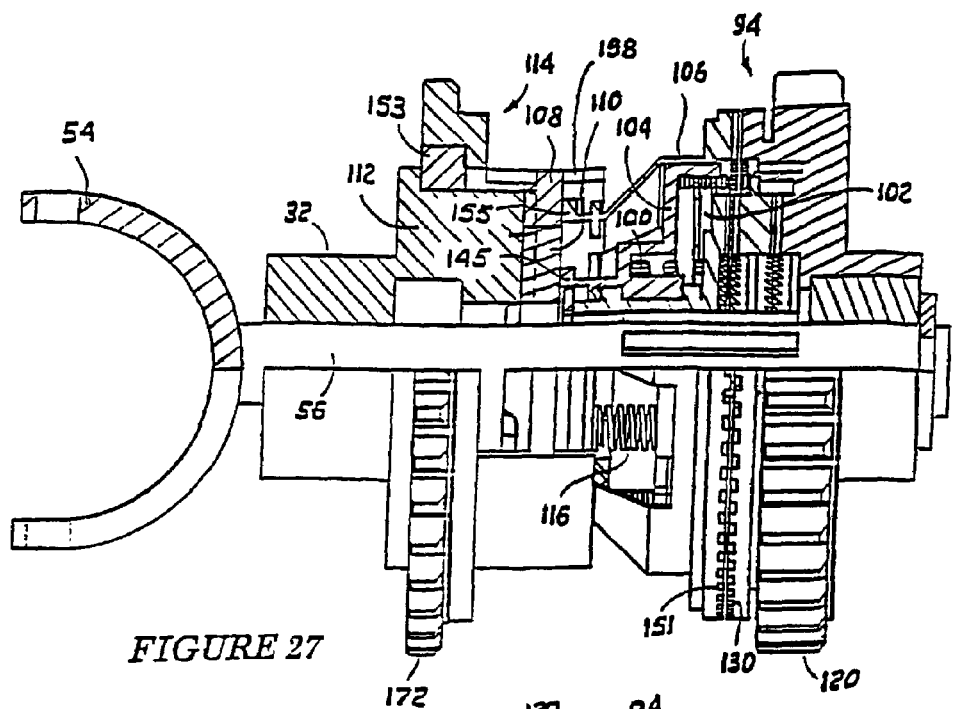
FIG. 27 is a half sectioned side elevation of the assembled extraction device and output unit.

The four hub springs 116, as shown in FIGS. 23 and 27 are located in compression between formations 152 in the outer coupling hub 106 and the rear face of the inner coupling hub 104 to bias a pressure ring 155 on the rear of the outer coupling hub 106 against the smooth front face of the outer cam unit 108. The rear face of the outer cam unit 108 includes two identical rearwardly projecting cam profiles 154 that press against the cam face of the cam profile unit 112 while being rotatably driven, in use, by peripheral drive formations 156 on the outer cam unit 108 which are slidably located in axial drive slots 158 of the cam driver 114. All of the lobes and cam profiles are phased 180° apart.

Figure 26:
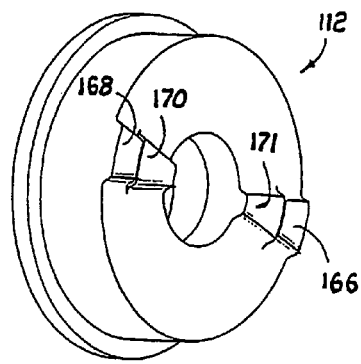
FIG. 26 is a perspective view of the cam profile unit of the angular velocity extraction device of FIG. 23.

The inner cam unit 110 carries diametrically opposite peripheral driver formations 160 which are slidably engaged in slots 162 in the bore of the outer cam unit 108. The rear face of the cam unit 110 carries two cam lobes 164 which, in use, ride on the front face of the cam profile unit 112 which includes four cam lobes 166, 168, 170 and 171, as seen in FIG. 26.

In the assembled extraction device the cam lobes 166 and 168 bear against the rear face of the outer cam unit 108 to interact with its cam lobes 154, in use, and the lobes 170 and 171 bear against the rear face of the cam unit 110 to interact with its lobes 164.

A ring bearing 153 is in the assembled unit located on the cam profile unit 112 up against a rear flange on the unit, as shown in FIG. 27.

The entire extraction device 26 and the output unit 94, as shown in FIG. 23, are assembled on the output shaft 56 in the sequence of the components illustrated in FIGS. 23 and 27 with the linear splines of the extension shaft to the output shaft 56 being slidably engaged with the synchroniser unit 98 splines, as mentioned above. The combined extraction device 26 and output unit 94 is mounted on and carried by the slide frame 32 by the cam profile unit 112 being fixed to the frame 32, as shown in FIG. 27.

Figure 28:
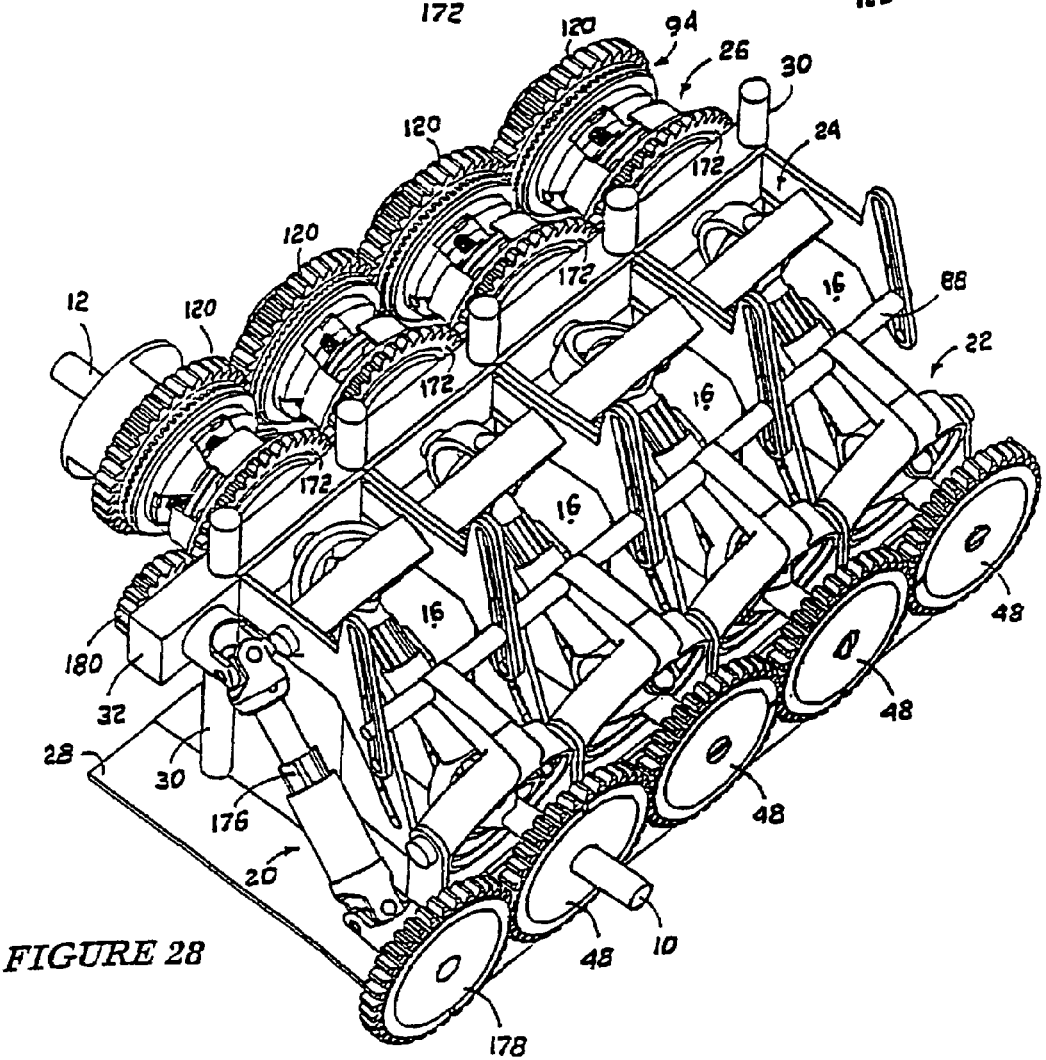
FIG. 28 is a perspective view of the entire IVT machine of the invention.

During operation of the transmission stage 16 the cam driver 114 gear 172 and so the cam units 108 and 110 which are engaged with it are rotated by the FIG. 28 synchronising drive unit arrangement 20 from the input divider 14 in a ratio of 2:1 to the input shaft 10 angular velocity and the coupling hubs 104 and 106 of the output unit 94 are together freely rotated independently of the cam units and their drive gear in a ratio of 1:1, by the splined shafts 56 of the profile generators 22 and 24, relatively to the input shaft 10.

The arrangement of the outer cam unit 108 lobes 154 and the outer cam profiles 166 and 168 of the cam profile unit 112 is such that when operated the outer cam unit 108 is forced away from cam profile unit 112 for a duration of 45° of a single revolution which results in a 90° duration of rotation on the input shaft 10 because of the above mentioned 2:1 ratio of rotation on the cam driver 114 between them. This action will therefore occur twice for each revolution of cam driver 114 or once for each revolution of the input shaft 10.

The arrangement of the inner cam lobes 170 and 171 of the cam profile unit 112 and the inner cam profiles 164 of the inner cam unit 110 is such that when operated the inner cam unit 110 is forced away from cam profile unit 112 for a duration greater than 45° which results in a greater than 90° duration on the input shaft 10 again because of the above mentioned 2:1 ratio. This action will occur twice for each revolution of cam driver 114 or once for each revolution of the input shaft 10.

As the cam driver 114 is rotated by the synchronising drive arrangement 20, the inner cam lobes 170 and 171 first come into contact with the inner cam unit lobes 164 on the cam profile unit 112 and ride onto the lobes 164 to cause the inner cam unit 110 to move forwardly against the pressure ring 145 of the inner coupling hub 104 to force the inner coupling hub 104 together with the synchronisation unit 98 forward toward the output gear 120 against the bias of the second coil spring 102 until the serrated teeth of the toothed rings 140 of the synchroniser unit and rear toothed ring 134 of the axial displacer 96 engage with each other.

Should the engagement of the serrated teeth on the toothed rings 140 and 134 result in a complete mesh the dog clutch teeth 130 on the output gear 120 and the teeth 151 on the outer coupling hub 106 will be synchronised and with further rotation of the cam driver 114 the outer cam unit lobes 154 on the outer cam unit 108 will come into contact with the outer cam lobes 168 and 166 on the cam profile unit 112 and ride onto the lobes to bring the forward smooth face of the outer cam unit 108 into pressure bearing contact with the pressure ring 155 of the outer coupling unit to force the coupling hub 106 and its ring of dog clutch teeth 151 forwardly into full mesh with dog clutch teeth 130 on the output gear 120 and so to cause the output gear 120 to rotate for the 45° duration of the cam dwell time while holding the four hub springs 116 compressed.

If, however, the engagement of the teeth of the toothed rings 140 and 134 result in an incomplete mesh, i.e. the sloping ramps of the teeth are engaged and not their parallel radial saw tooth driving faces, the forward motion of the synchronisation unit 98 will tend to be arrested and the dog clutch teeth 130 and 151 will not be synchronised in engaging alignment. The unrelenting forward cam induced force will override the biasing force of compression spring 100 and cause the inner coupling hub 104 to be moved forwardly and simultaneously to be twisted in rotation on the helically splined sleeve 142 of the synchronisation unit 98.

The angular displacement of this twisted motion is related to the magnitude of the incomplete mesh of the teeth of the toothed rings 140 and 134 and is sufficient to bring the dog clutch teeth 130 and 151 into synchronised register for full mating on further rotation of the cam driver 114. This will occur when the outer cam lobes 154 come into contact with the outer cam lobes 168 and 166 on the cam profile unit 112 and ride onto the lobes while forcing the outer coupling hub 106 and its dog clutch teeth 151 forward into full mesh with the dog clutch teeth 130 on the output gear 120 to drive the rotating output gear only for the duration of the 45° cam dwell time while holding the four hub springs 116 compressed.

Because of the time lag between the operation of the inner cam unit 110 and the outer cam unit 108 a situation might arise where, during this time lag, the teeth of the toothed rings 140 and 134 might become fully engaged and tend to drive one another. When this situation arises the tooth ramps of the synchronisation plate 132 and the tooth ramps of the synchronisation plate 122 will ride on each other to compress the four displacer springs 118 to keep the dog clutch teeth 151 and 130 synchronised and ready for smooth meshing on the action of the cams 154 of the outer cam unit 108 at the end of the time lag.

Thus far in the specification the operation of only one angular velocity stage 16 has been described. FIG. 28 illustrates the complete IVT machine of FIG. 1 where its four identical transmission stages 16 are shown mounted together in a common support frame 28.

From FIG. 28 it is seen that the four input divider 14 drive gears 48 are meshed with each other, as are the cam driver gears 172 of the extraction devices 26 and the output gears 120. Additionally the slide frames 32 and the transverse control shafts 88 and 90 of the angular velocity profile generators 22 and 24 of the transmission stages 16 are coupled for concomitant movement on the guide rails 30 and in the angle regulating slots 38 and 44.

The drive synchronisation arrangement 20 is shown in FIG. 28 to consist of a universal joint drive arrangement 176 which is driven by a gear 178 which in turn is driven by a gear 48 of the input divider. A drive gear 180 is meshed with and drives the meshed cam driver gears 172 of the extraction devices in a ratio of 2:1 as mentioned above. The universal shaft of the drive arrangement 176 is telescopic to cater for movement of the coupled slide frames 32 on the guide rails 30 relatively to the input divider drive gears 48.

The input divider gears 48, as are the cam driver gears 172 and the output collector 18 gears 120, coupled together in each gear set in a ratio of 1:1. The machine output shaft 12 is attached to a cage which is fixed to an output gear 120. The transmission machine's input and output shafts 10 and 12 respectively rotate in a common direction.

The gears 48 of the input divider are, as indicated by the lines on the ends of the input shafts which they drive, meshed at 90° with respect to each other whereas the cam driver gears 172 of the extraction devices 26 are meshed at 45°.

The amplitude of the transmission stage 16 output angular velocities and so the output range of the machine is varied, as mentioned above, by moving the ganged slide frames 32 upwardly and downwardly on the guide rails 30. In practice, the composite frame 32 may be movably controlled by a conventional servo motor leadscrew arrangement, not shown.

Additionally as the output shaft 12 of the machine is, in use, moving relatively to the framework of the machine the output shaft 12 will need to be coupled through a suitable coupling such as a universal joint arrangement, similar to the synchronisation drive arrangement 176, to a static remotely supported output shaft.

In use, using as an example the angular settings of FIGS. 20 and 21, the constant maximum velocity duration of each output shaft 56 of the second profile generator 24 will be 90° (with reference to the input shaft rotation) throughout the setting range as shown in the FIGS. 20 and 21 graphs. If a constant angular velocity input of 100 rpm is applied to the input shaft 10, the output shafts 56 of the second profile generators 24 will sequentially rotate through the 90° maximum velocity duration (with reference to the input shaft rotation) and will each only then cause the extraction devices 26 connected to them to engage and drive an output gear 120 of the four meshed gears of the output collector 18 for the 90° maximum angular velocity duration of rotation. While one of the gears 120 is being driven the three remaining gears 120 are not engaged by their extraction devices as their meshed gears in the output collector 18 have a greater angular velocity than that of their profile generator drive shafts 56 and are merely rotated by the driven gear. The 90° synchronised phasing of the extraction devices (with reference to the input shaft 10) ensures that the 90° linear section of angular velocity drive output from the four extraction devices are correctly summed by the output collector 18 to apply a linear 360° output to the machine output shaft 12 for each revolution of the input shaft 10. Additionally, as the four output gears are rotating at the same speed the transition of the 90° arc of driven power from one output gear to another is smooth so eliminating ripple modulating devices such as planetary gear arrangements and the need for shock absorbing mechanisms as is the case with IVT's of the prior art.

Figure 29:
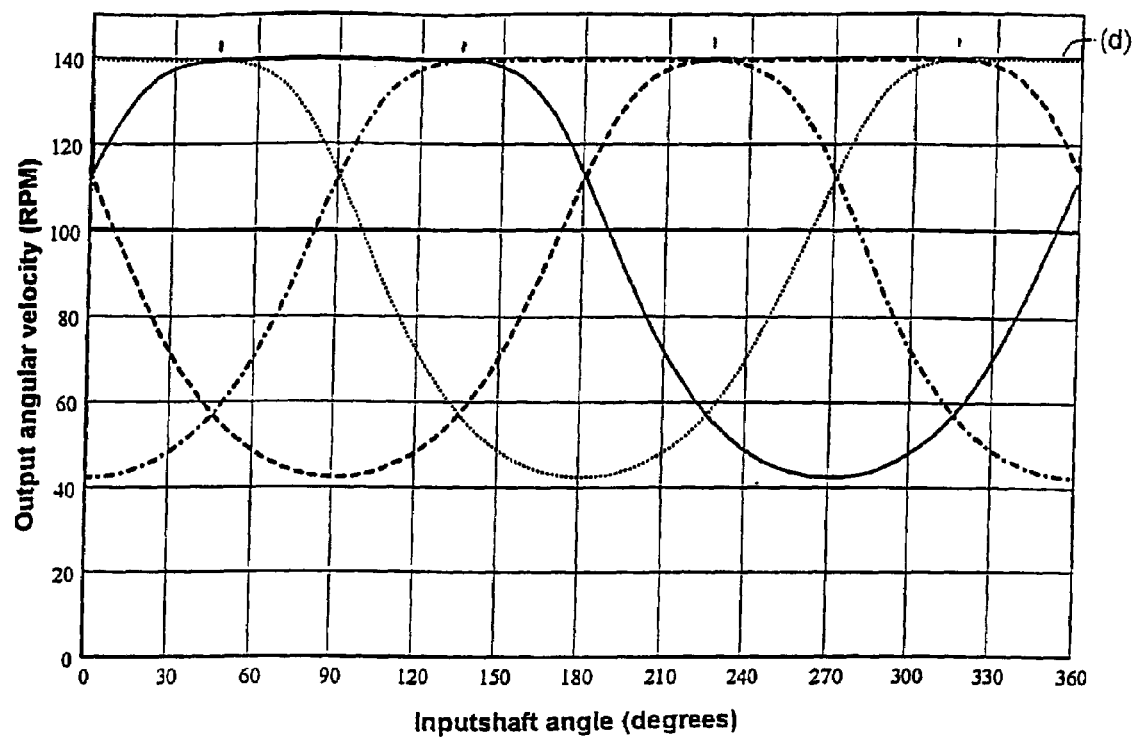
FIG. 29 is a graph illustrating the combined outputs of the four extraction devices of the FIG. 28 machine.

The input/output ratio R of the machine which is defined as $$R = \frac{\text{Angular velocity at output shaft 12}}{\text{Angular velocity at intput shaft 10}},$$

depends on the vertical height of the sliding frame 32 which determines the operating angle $\phi$ and with the correct values of $\theta_1$, $\lambda_1$, $\theta_2$ and $\lambda_2$ determined by the guiding slots 38 and 44 respectively together with the fixed values of $\lambda_s=45°$, $\beta=0°$ and $\delta=90°$, produces a constant ripple free output angular velocity (d) at the machine output shaft 12, as illustrated in FIG. 29. FIG. 29 shows that for the set-up indicated by FIGS. 20 and 21 a maximum output velocity of 140 rpm can be obtained or a ratio of R=1.4 or a 40% increase from the input angular velocity of 100 rpm. The output range for an input angular velocity of 100 rpm with above set-up will be 100 to 140 rpm.

The above serves only as an example and is not limited to the above values for $\theta_1$, $\lambda_1$, $\theta_2$, $\lambda_2$, $\lambda_s$, $\phi$, $\delta_1$, $\delta_2$ and $\beta$. Any combination of these values may be used to obtain a selected output angular velocity profile which may not necessarily, in other applications, be limited to a constant output angular velocity.

Figure 30:
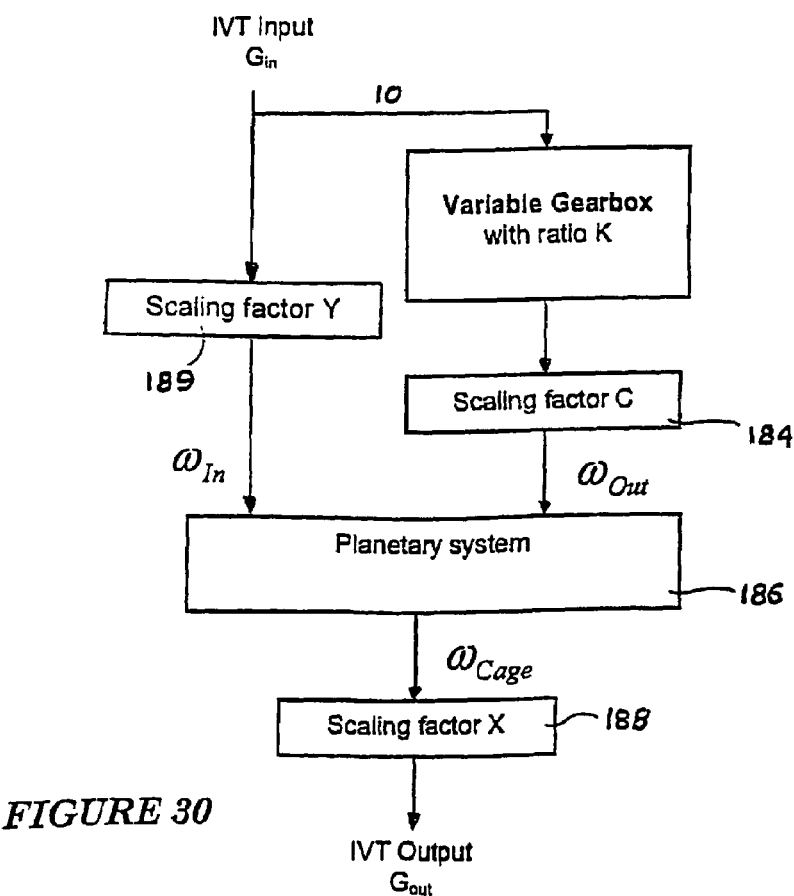
FIG. 30 is a block diagram of a range extension arrangement for the FIG. 28 machine.

To vary the ratio range of the IVT machine of the invention, which is described above the machine of the invention with a ratio K that may vary from 1:1 to 1:1.4, as shown in FIG. 30, could be made to include a fixed ratio gear arrangement 184 having a scaling factor C and the input 10, $G_{IN}$ could be divided between a direct feed to a planetary system 186 to be combined with the gearbox output, with the output of the planetary system 186 then being multiplied by a fixed gear ratio arrangement 188 having a scaling factor of X to provide the IVT output $G_{OUT}$. The direct input feed to the planetary system could also include a gear arrangement 189 having a scaling factor Y as shown in FIG. 30.

With Y=1, a typical equation governing the system in FIG. 30 is as follows:

$$G_{out} = 0.5 \cdot X \cdot G_{in}(1 - K \cdot C)$$

From the above equation it can be seen that the neutral point, where the IVT output is zero, is reached when K·C=1. By calculating the scaling factors C and X for a specific variable gearbox with ratio K, the desired ranges (forward and reverse) for the IVT can be set. For example if C=0.83 and K may vary from 1 to 1.4 the following is true:

If $K = 1.2$ then $G_{out}$
$= 0.5 \cdot X \cdot G_{in}(1 - 1.2 \cdot 0.83)$
$= 0$ Thus the output is locked and zero.

If $K = 1$ then $G_{out}$
$= 0.5 \cdot X \cdot G_{in}(1 - 1 \cdot 0.83)$
$= 0.085 \cdot X \cdot G_{in}$ Thus the direction of rotation $G_{out}$ is forward.

If $K = 1.4$ then $G_{out}$
$= 0.5 \cdot X \cdot G_{in}(1 - 1.4 \cdot 0.83)$
$= -0.081 \cdot X \cdot G_{in}$ Therefore the direction of rotation of $G_{out}$ is reversed.

X can be any fixed gear ratio while $G_{in}$ may be any angular velocity input.

The IVT machine described with reference to FIG. 28 includes four angular velocity transmission stages with their extraction devices each extracting a 90° section of maximum angular velocity from their maximum velocity sections are summed by the output gears 120 in the output collector 18 to provide at the machine output shaft 12 360° of absolutely linear angular velocity, as mentioned above. The machine of the invention is, however, not limited to the employment of four transmission stages. For example the 360° linear velocity output could be achieved by three transmission stages which each extract 120° linear sections of angular velocity or six transmission stages which each extract 60° sections of linear angular velocity from their profile generator output angular velocities. The machine is further not limited to extracting only maximum angular velocities and may be adjusted to extract any desired portion of the angular velocity profile.

Figure 31:
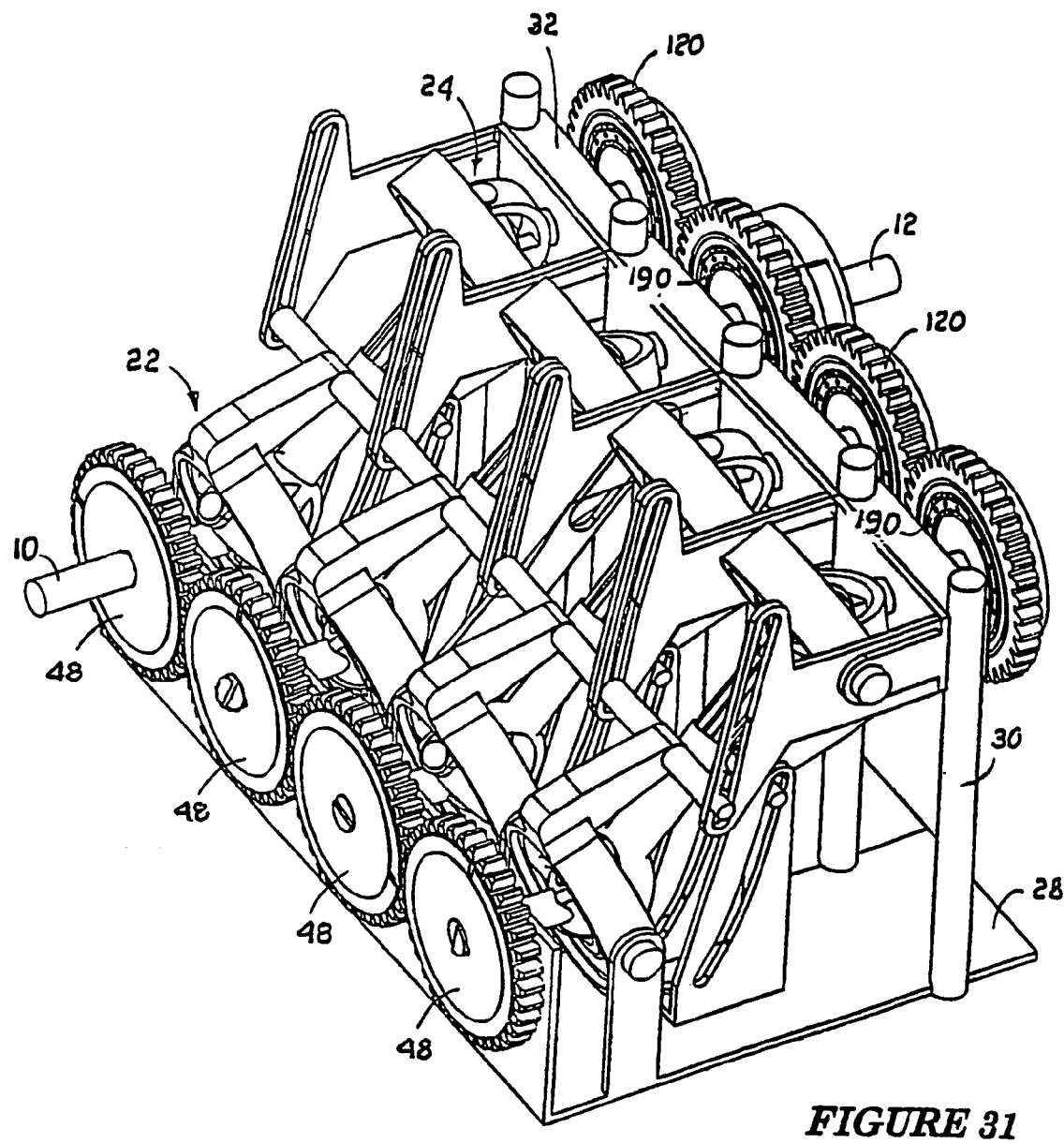
FIG. 31 is a perspective view of an embodiment of the IVT machine which is adapted for single direction power transmission.

The IVT machine illustrated in FIG. 31 is a variation on the machine of FIG. 28 only in that the extraction devices 26 and output units 94 of the FIG. 28 machine have been replaced by output gears 120 which are mounted on and index rotated by sprag clutches 190. The drive synchronisation arrangement 20 is, in this embodiment of the invention, unnecessary in that the clutch 190 having the largest velocity will always engage its output gear 120 with this happening in sequence through the output collector 18 gears 120.

The simpler IVT machine of FIG. 31 may find application in any application in which it is required to transmit power in one direction only.

Example of Ratio Range Extension of the FIG. 31 IVT Machine

Figure 32:
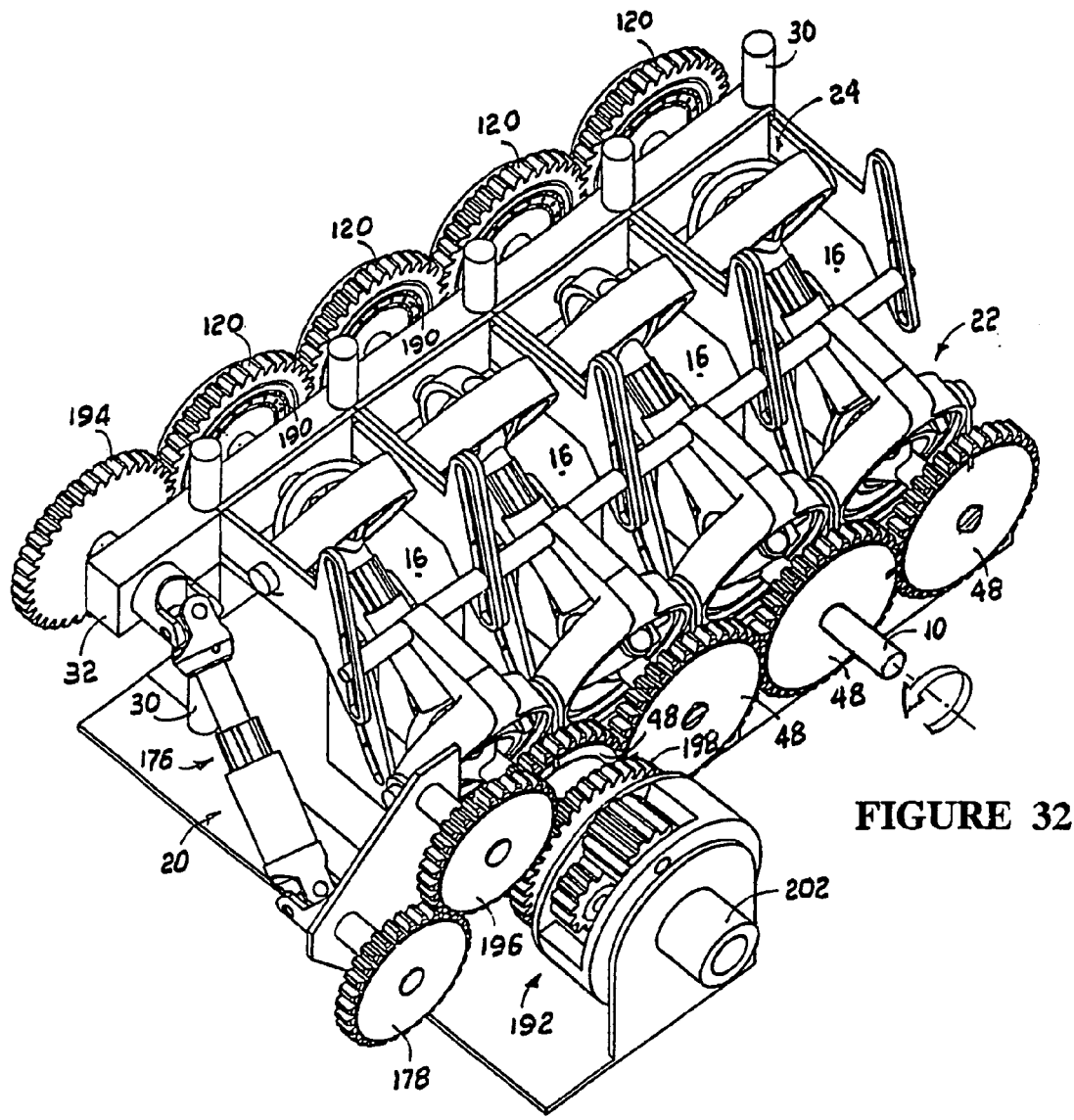
FIG. 32 is a perspective view of the FIG. 31 machine which is adapted for extended range and reverse direction operation.

The machine of FIG. 32 is that of FIG. 31 including an extended ratio range variation arrangement similar to that of FIG. 30, which, however, in this case excludes the scaling factor X and Y fixed gear arrangements 188 and 189, as shown in FIG. 30, and has a reverse direction capability.

Figure 33:
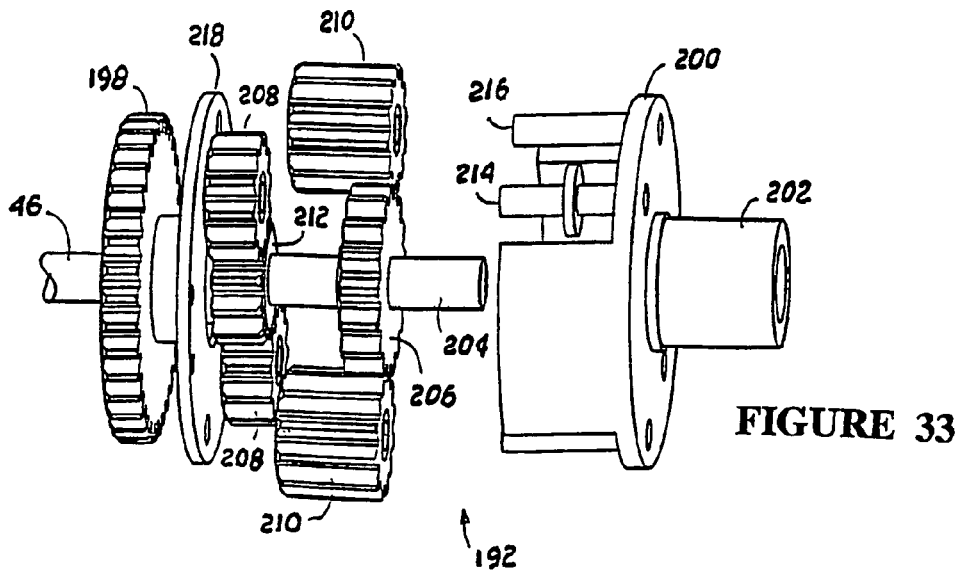
FIG. 33 is an exploded perspective view of the planetary gear arrangement on the FIG. 32 machine.

The range variation arrangement of the FIG. 32 machine includes the driver synchronisation arrangement 20 of the FIG. 28 machine and a planetary gear arrangement 192 which is more clearly seen in its exploded form in FIG. 33. In this case the purpose of the drive arrangement 20 is to feed the output of the variable gearbox from the machine output gears 120 into the planetary gear arrangement 192, through a scaling factor C only, to conform to the FIG. 30 layout as opposed to its function in FIG. 28 where the arrangement 20 is used to drive the synchronisation clutches. This arrangement may, however, additionally include the extraction devices 26 but will then need an additional synchronisation drive arrangement 20 to drive the cam driver gears 172.

The drive arrangement 20 is driven by a gear 194 which is coupled in a 1:1 ratio to the meshed output collector gears 120 and drives, through the drive arrangement 20 a synchronisation gear 178. The gear 178, drives an idler gear 196 and a drive gear 198 of the planetary arrangement 192. Thus gear 194, 178, 196 and 198 represents scaling factor C in FIG. 30.

The planetary gear arrangement 192 is shown in FIG. 33 to comprise a planetary cage 200 which is integral with the machine output shaft 202, an input shaft 204 which is an extension of the input shaft 46 of the transmission stage 16 with which it is engaged and which carries a drive gear 206, planetary idler gears 208 and 210 and a sun gear 212 which is rotatable on the shaft 204 and is coupled to and driven by the gear 198. The gear 212 is engaged with the drive gear 206 through the idler gears 208 and 210 which are rotatable on idler shafts 214 and 216 respectively which are fixed to and located between the planetary cage 200 and a planetary plate 218 which is within the cage 200 of the assembled unit.

In this example of the range extension method of the invention the number of teeth on the various gears are as follows:

Gear 120—36 teeth
Gear 194—36 teeth
Gear 178—30 teeth
Gear 196—30 teeth
Gear 198—36 teeth
Gear 206—17 teeth
Gears 210—12 teeth
Gears 208—12 teeth
Gear 212—12 teeth In this example it is assumed that a constant input angular velocity of 1000 rpm is applied to the input shaft 10 of the machine in the positive direction of the arrow in FIG. 32 and that the ratio between the input shaft 10 and output gears 120 can vary between the ratios of 1:1 and 1:1.4. The formula governing the planetary system is as follows:

$$e = \frac{\text{Product of teeth on driven gears}}{\text{Product of teeth on driven gears}} \quad\quad A$$

$$= -\frac{17 \cdot 12 \cdot 12}{12 \cdot 12 \cdot 12} = -\frac{17}{12}$$

$$= \frac{Vel\ 212 - Vel\ 200}{Vel\ 206 - Vel\ 200}$$

where
  it is assumed that gear 206 is the designated drive gear and gear 212 the driven gear.
  the sign of e depends on the direction of rotation of gear 212 if the planetary cage 200 is kept stationary and gear 206 rotated. If gear 212 and 206 are rotating in the same direction the e is positive or else negative as in the case of the example.

The following notation is used:
  Vel 206=angular velocity of gear 206
  Vel 212=angular velocity of gear 212
  Vel 200=angular velocity of planetary cage 200

Solving for Vel 200 in equation A results in the following:

$$Vel\ 200 = \frac{17}{29} \cdot Vel\ 206 + \frac{12}{29} \cdot Vel\ 212 \quad\quad B$$

1:1 Variable Position

With the ratio between the input shaft 10 and the output gears 120 being 1:1 gear 198 and thus also gear 212 will be rotating at:

$$Vel\ 212 = -1000\ \text{rpm} \cdot \frac{30}{36} = -833.33\ \text{rpm}$$

Gear 206, being connected via shaft 204 and gears 48 to the input shaft 10, will rotate at 1000 rpm. Using equation B the output angular velocity Vel 200 and so at the output shaft 202 is calculated as:

$$Vel\ 200 = \frac{17}{29} \cdot 1000\ \text{rpm} + \frac{12}{29} \cdot -833.33\ \text{rpm} = 241.38\ \text{rpm}$$

1:1.4 Variable Position

With the ratio between the input shaft 10 and the output gears 120 being 1:1.4 the gear 198 and thus also the gear 212 will be rotating at:

$$Vel\ 212 = -1000\ \text{rpm} \cdot \frac{30}{36} \cdot 1.4 = -1166.66\ \text{rpm}$$

Gear 212, being connected via shaft 204 and gears 48 to the machine input shaft 10, will rotate at 1000 rpm. Using equation B the output angular velocity Vel 200 and so at the output shaft 202 is calculated as:

$$Vel\ 200 = \frac{17}{29} \cdot 1000\ \text{rpm} + \frac{12}{29} \cdot -1166.66\ \text{rpm} = 103.45\ \text{rpm}$$

Thus the variation in ratio between the input shaft 10 and output shaft 202 is calculated as $$1 : \frac{241.38\ \text{rpm}}{103.45\ \text{rpm}} = 1:2.33.$$

Thus the range of the IVT have been extended from 1:1.4 to 1:2.33 by using above method incorporating a suitable planetary system.

Direction Changing Example

If the gear 206 contained 12 teeth and the gear 212 13 teeth then the e value of the planetary system becomes as follows with the use of equation A:

$$e = \frac{\text{Product of teeth on drive gears}}{\text{Product of teeth on driven gears}} = \qquad\qquad C$$

$$-\frac{12 \cdot 12 \cdot 12}{13 \cdot 12 \cdot 12} = -\frac{12}{13} = \frac{Vel\ 212 - Vel\ 200}{Vel\ 206 - Vel\ 200}$$

Solving for Vel 200 in equation A results in the following:

$$Vel\ 200 = \frac{12}{25} \cdot Vel\ 206 + \frac{13}{25} \cdot Vel\ 212 \qquad\qquad D$$

With all of the other gears remaining unchanged the following is true for different ratios of the variable unit:

1:1 Variable Position

With the ratio between the input shaft 10 and the output gears 120 being 1:1 the gear 198 and thus also the gear 212 will be rotating at:

$$Vel\ 212 = -1000\ \text{rpm} \cdot \frac{30}{36} = -833.33\ \text{rpm}$$

Gear 206 being connected via shaft 204 and gears 48 to the input shaft will rotate at 1000 rpm. Using equation D the output angular velocity Vel 200 and so at the output shaft 202 is calculated as:

$$Vel\ 200 = \frac{12}{25} \cdot 1000\ \text{rpm} + \frac{13}{25} \cdot -833.33\ \text{rpm} = 46.66\ \text{rpm}$$

1:1.4 Variable Position

With the ratio between the machine input shaft 10 and the output gears 120 being 1:1.4 gear 198 and thus also the gear 212 will be rotating at:

$$Vel\ 212 = -1000\ \text{rpm} \cdot \frac{30}{36} \cdot 1.4 = -1166.66\ \text{rpm}$$

Gear 212, being connected via shaft 204 and gears 48 to the input shaft 10, will rotate at 1000 rpm. Using equation D the output angular velocity Vel 200 and so at the output shaft 202 is calculated as:

$$Vel\ 200 = \frac{12}{25} \cdot 1000\ \text{rpm} + \frac{13}{25} \cdot -1166.66\ \text{rpm} = -126.66\ \text{rpm}$$

It can thus be seen that the output range of the machine is now 46.66 rpm to −126.66 rpm and thus includes two ranges in different directions with a neutral point, where the cage 200 is stationary and locked. The angular velocity of gear 212 at this point can be calculated by setting equation D equal to zero with Vel 200=1000 rpm and solving for Vel 212 as follows:

$$0 = \frac{12}{25} \cdot 1000\ \text{rpm} + \frac{13}{25} \cdot Vel\ 212$$

$$Vel\ 212 = 923.08\ \text{rpm}$$

Figure 34:
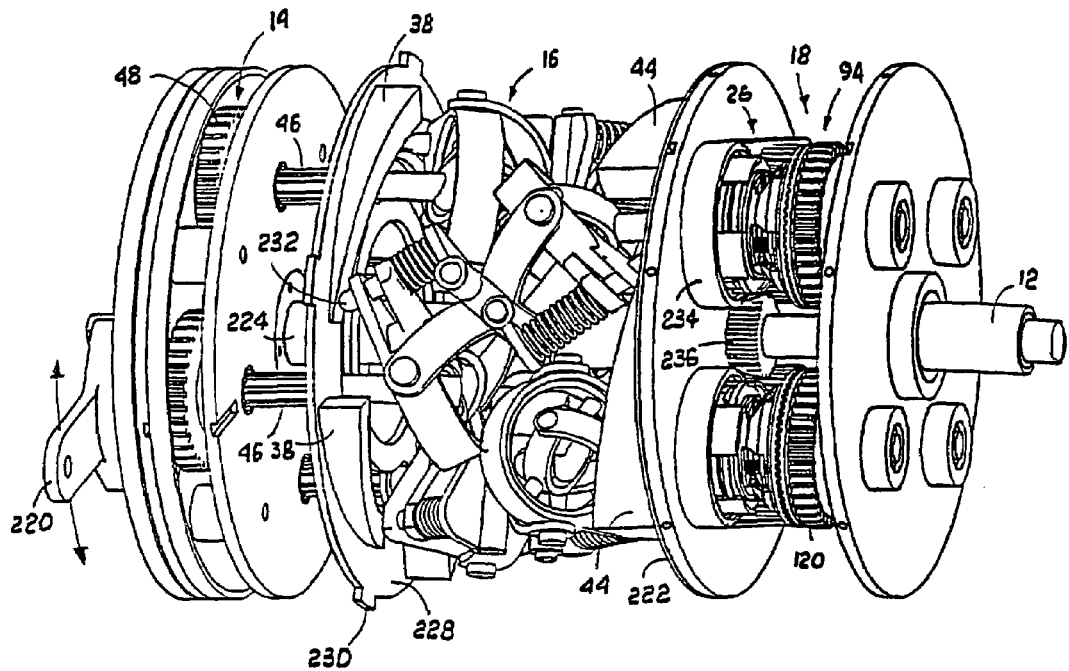
FIG. 34 is a perspective view of a further embodiment of the IVT machine of the invention in a cylindrical configuration.
Figure 35:
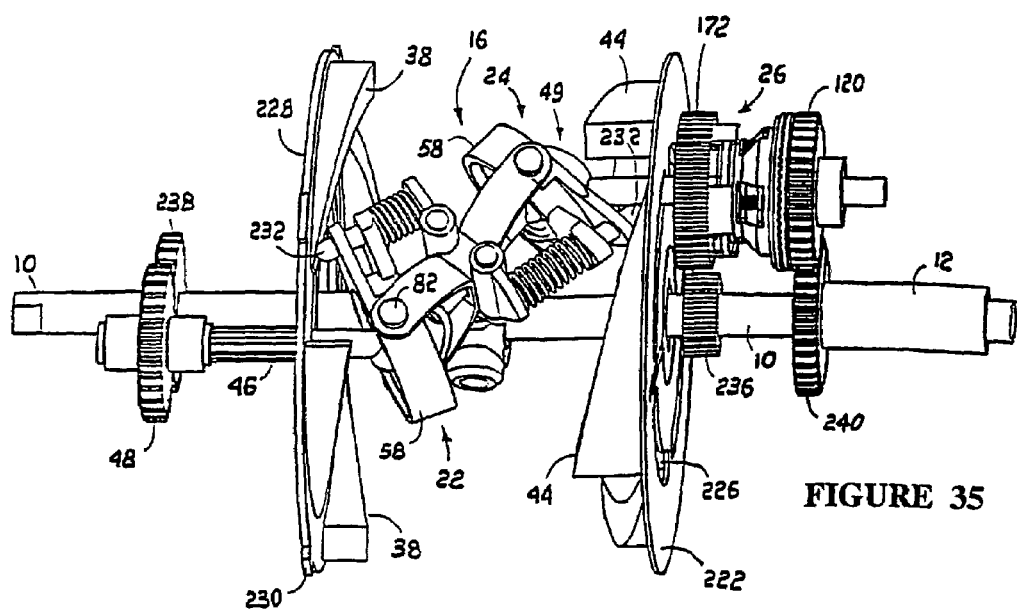
FIG. 35 is a perspective view of a single transmission stage of the FIG. 34 IVT machine.

The embodiment of the IVT machine of the invention which is illustrated in FIGS. 34 and 35 operates in the same fashion and on the same principles as the machine of FIG. 28 and is included here merely to illustrate the cylindrical configuration of the machine as opposed to the FIG. 28 in line parallel arrangement. FIG. 35 illustrates only one of the transmission stages 16 of the machine of FIG. 34. Many of the reference numbers in FIGS. 34 and 35 indicate components which serve the same function as those which are described with reference to the machine of FIGS. 1 to 30.

The machine of FIG. 34 is controlled by rotation of a handle 220, which is attached to the rotatable input divider 14, and rotates a cam plate 222 to which it is attached via a centre tube 224, which is shown only partially in FIG. 34. The cam plate 222 has curved slots 226 which pass over the output shafts of the transmission stages 16 as the cam plate 222 is rotated (see FIG. 35). The input shaft 10 passes through the centre of the machine within the centre tube 224. A second cam plate 228 is positioned against flanges (not shown) on the input shafts 46 to limit axial movement of the cam plate 228 while rotational movement of the plate 228 and its curved slots 226, not shown, over the input shafts 46 is prevented by projections 230 on its periphery which are located in axial slots within the cylindrical casing (not shown) to which the output collector 18 is also attached.

The ramped cams on the cam plates 222 and 228 corresponds in function to that of the slots 44 and 38 of the angular velocity profile generators of FIGS. 2 and 3.

The angle θ and λ adjuster rings 58 of the angular velocity profile generators 22 and 24 of this embodiment of the invention are controlled to compensate for operational rotation of the input divider 14 by spring biased cam followers 232 which ride on the cams 38 and 44 to suitably vary the plane of operation of the angle adjuster rings 58 and so the gimbal rings 50 which they carry.

The extraction device 26 cam driver gears 172 are, in this embodiment of the invention, driven by a continuous toothed drive belt 234 (not shown in FIG. 35) which is engaged with each of them as well as to the input shaft 10 via a toothed belt drive 236 in place of the synchronisation universal arm 176 of the embodiment illustrated in FIG. 28.

A gear 238 on the input shaft 10 is meshed with and drives the four gears 48 of the input divider 14 and a gear 240 which is attached to a tubular output shaft 12 is engaged with and driven by the output collector 18 gears 120.

Figure 36:
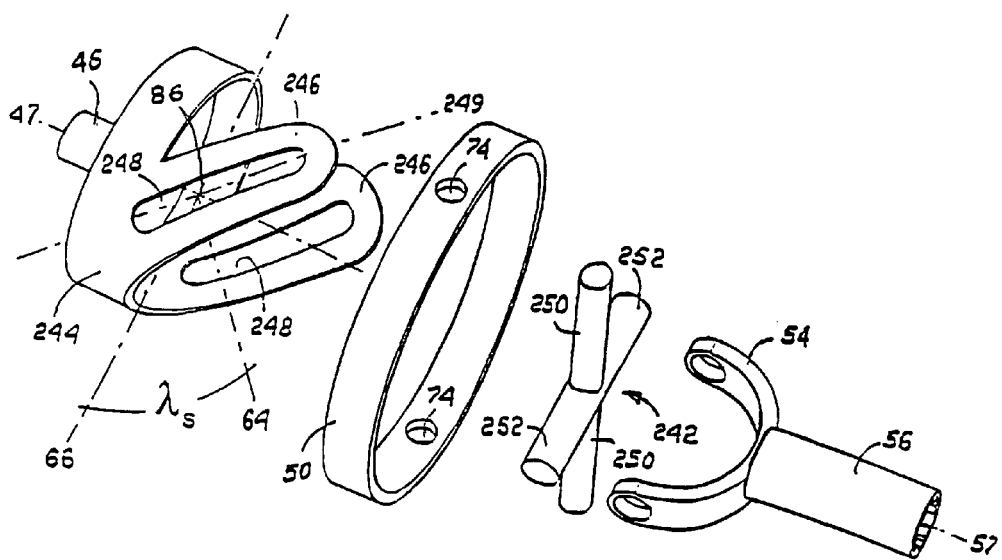
FIG. 36 is an exploded isometric view of a second embodiment of the angular velocity profile generator of the invention.
Figure 37:
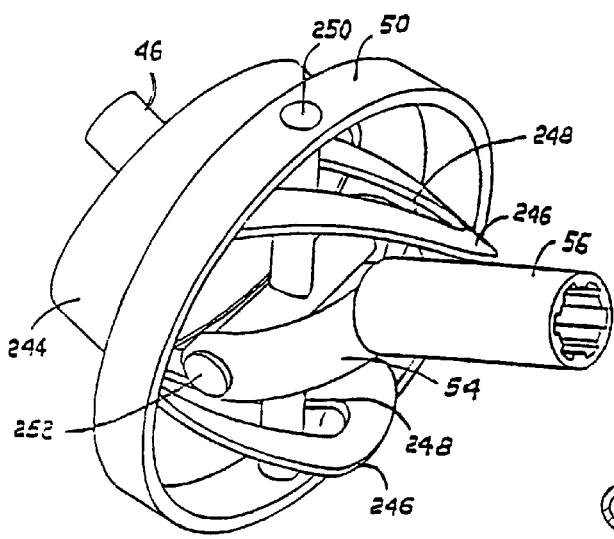
FIG. 37 is an isometric view of the assembled profile generator of FIG. 36.

The invention is not limited to the precise details as herein described. For example, FIGS. 36 and 37 illustrate an alternate structural configuration for the angular velocity profile generators 22 and 24 of the invention as described above. In this embodiment of the profile generator of the invention the gimbal ring 52 and the swivel rotor 68 are replaced by a cruciform element 242 and the input shaft 46 carries a fixed cup 244 which includes forwardly directed arms 246 which each include a slot 248. A plane which lies on the line 64 which is normal to a plane on the line 249 which includes the slots 248 is angled at an angle $\lambda_s$ from a line 66 which is normal to the input shaft axis, as shown in FIG. 4 (as is the rotor pivot pin 62 of the FIG. 4 embodiment). Legs 250 of the cruciform element pass through the slots 248 as shown in FIG. 37 and are held in position by the gimbal yoke 54 which is pivotally engaged with legs 252 of the element 242 and the enlarged gimbal ring 50 in which the ends of the legs 250 of the element 242 are pivotally engaged. The gimbal ring 50 is located in and rotatable relatively to the angle adjuster ring 58 as with the previous embodiment. During rotation of the input shaft 46 the induced oscillatory movement of the element 242 arms 250 in the slots 248, when the input 46 and output 56 shafts are misaligned, is controlled by the $\lambda_s$ angular position of the slots 248 to govern the planes of rotation in which the cruciform element operates in exactly the same manner as the swivel rotor 68 in the initial embodiment does. The remaining components of the profile generator of FIGS. 36 and 37 are identical to those described with reference to the previous embodiment.

The slots 248 are not restricted to being located in a plane which includes the line 249 and instead of being linear, as shown in FIGS. 36 and 37, could be curved with their direction of curvature being opposite in the two cup arms 246.

Figure 38:
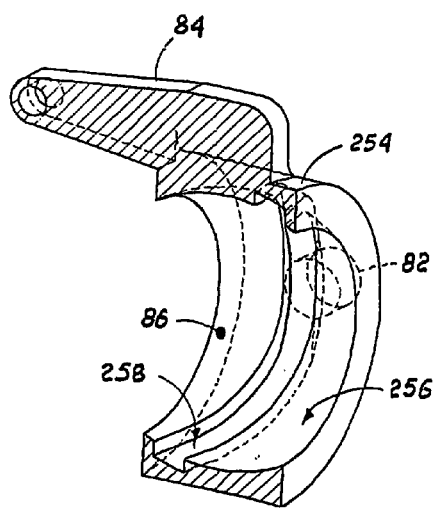
FIG. 38 is a half-sectioned isometric view of a component of yet a further embodiment of the profile generator of the invention.

In a further embodiment of the profile generator, which is related to that of FIGS. 36 and 37, the ring 50 with which the cruciform element legs 250 are engaged could be omitted. The angle adjuster ring 58 could then be replaced by a cylinder 254, as shown in FIG. 38, which is equivalent to the angle adjuster ring 58 and the gimbal ring 50. The bore of the cylinder 254 is outwardly curved with the curvature of its surface 256 conveniently lying between parallel lines on either side of the centre of an imaginary sphere which is situated on the static point 86 of a profile generator which it forms part of. The surface 256 carries an endless groove 258 in which the ends of the arms 250 of the FIG. 36 embodiment or the ends of the trunnions 70 of the FIG. 4 embodiment are located. The groove 258 guides the arms 250 or the trunnions 70 in a circular path, in use, around the static point with the path not necessarily lying in a plane of rotation.

The applications of the angular velocity profile generator of the invention are not, as mentioned above, limited to the use in IVT machines which produce only constant linear output angular velocity profile sections but may find other applications requiring specified velocity profiles which do not necessarily include constant angular velocity sections. The following is an example explaining, with reference to FIG. 39, the use of two angular velocity profile generators 22 and 24 of the invention which are connected in series for driving a camshaft of an internal combustion engine to enable on-line variable valve timing of the engine.

Figure 39:
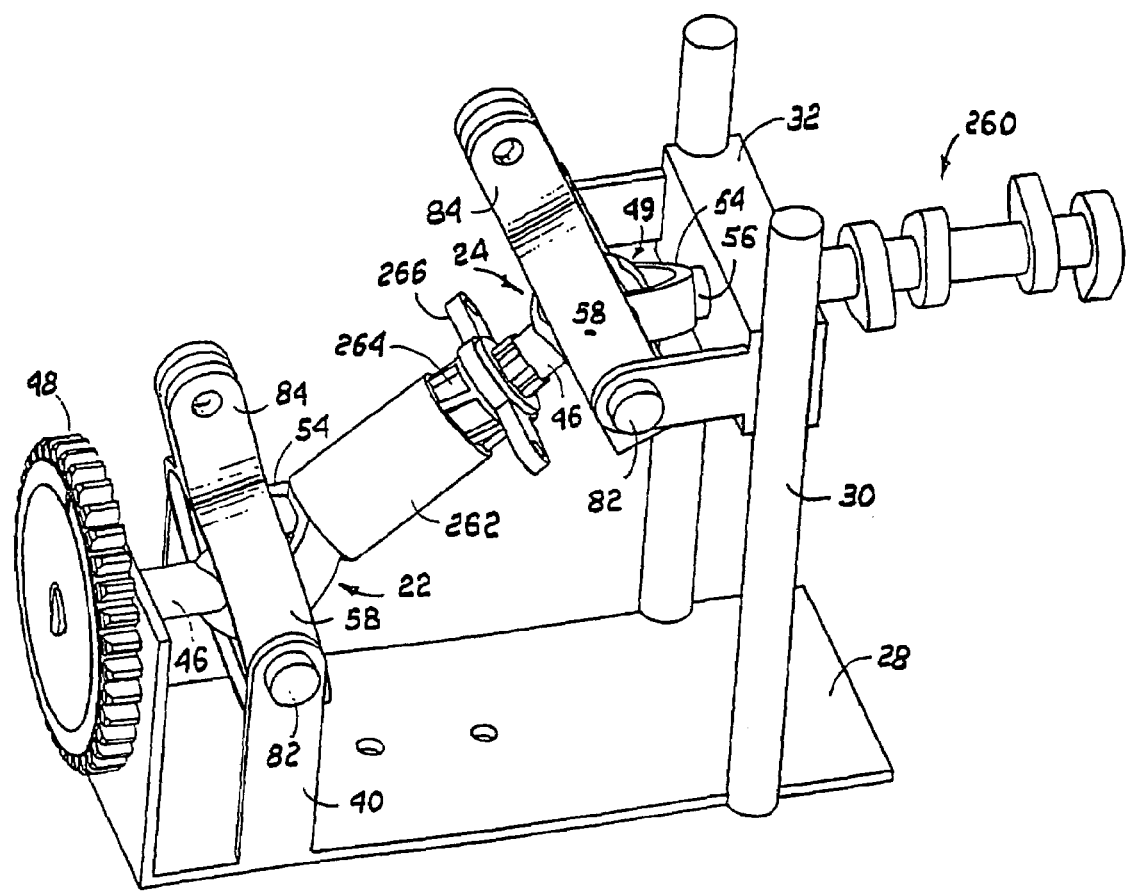
FIG. 39 is a perspective view of two angular velocity profile generators of the invention adapted for the operation of a cam shaft.

FIG. 39 includes largely the FIG. 3 components of a transmission stage 16 of the IVT machine, and here again, like reference numbers are used to indicate like components. In this example a camshaft 260 is connected to the yoke 54 of the profile generator 24 and replaces the FIG. 3 synchronisation clutch 26. The ring adjusters 84 are modified to be operated by a suitable positioning device (not shown) for independently positioning each of the ring adjusters 84 and so assume the function of the adjustment slots 38 and 44 in FIG. 3. The yoke 54 of the profile generator 22 is modified to include a sleeve 262 which carries a helically splined bore which mates with helical splines on a shaft 264. The shaft 264 includes a bore which is linearly splined and in which a splined shaft, which is integral with the input shaft 46 of the profile generator 24, is reciprocal. A radially projecting control member 266 is rotatably mounted on the shaft 264 and is movable in the direction of the shaft axis by a suitable positioning system (not shown). As the control member 266, and so the shaft 264, is moved the shaft 264 will shorten or lengthen as the case may be, by relative rotation of the helical splines on the input shaft 46, with this length variation being accommodated by the splined portion of the input shaft 46 of the profile generator 24, to cause relative rotation between the yoke 54 of the profile generator 22 and the input shaft 46 of the generator 24 to adjust $\beta$.

Figure 40:
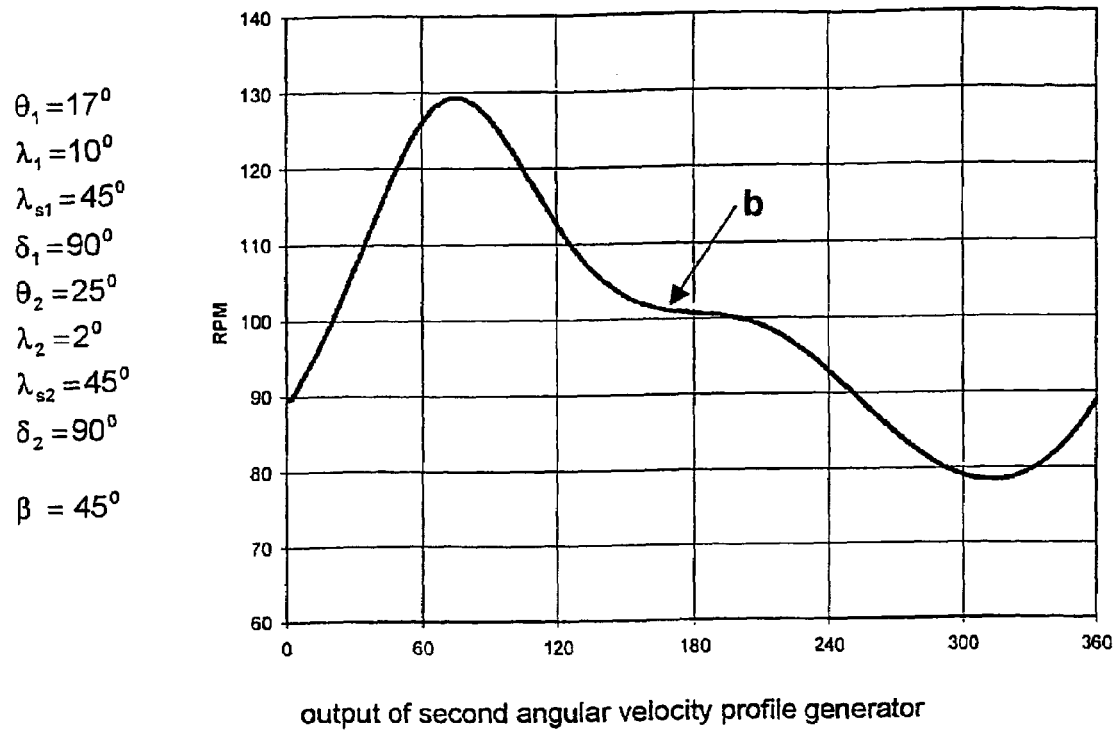
FIGS. 40 and 41 are graphs illustrating possible angular velocity output profiles which could be produced by the profile generator of the invention for the operation of the FIG. 39 cam drive arrangement.
Figure 41:
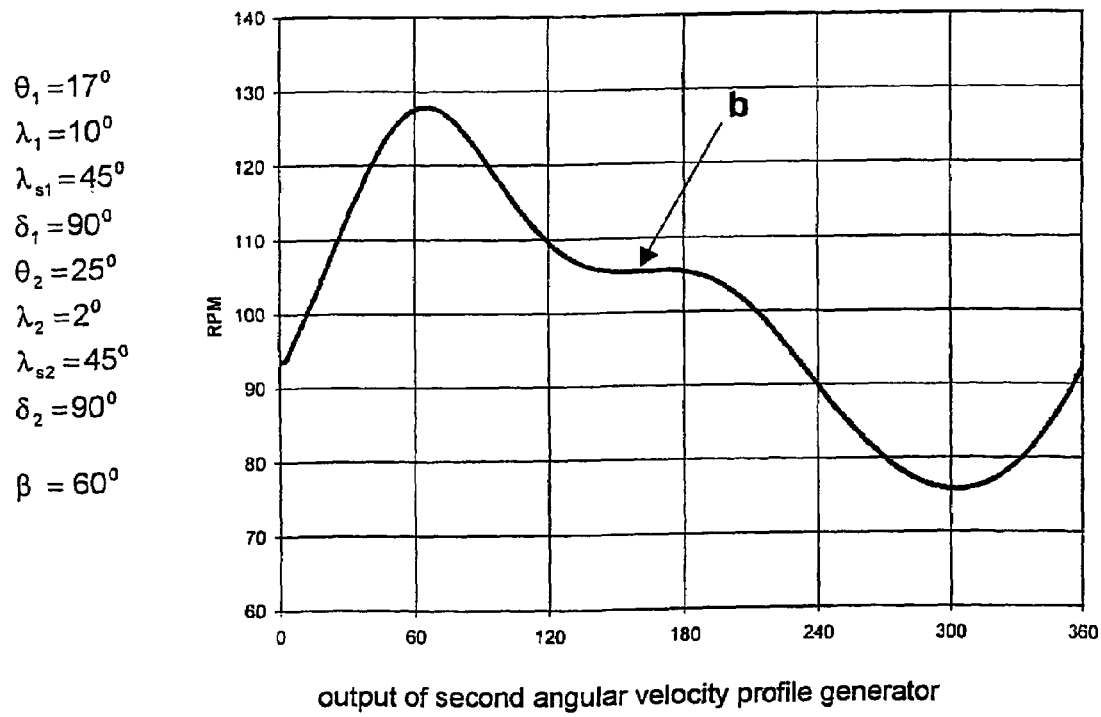

The graphs of FIGS. 40 and 41 each illustrate a possible output profile of each of the two angular profile velocity generators 22 and 24 of FIG. 39 with operating parameters as indicated on the left of the graphs. The operating parameters are the same for both graphs with the exception of the $\beta$ values which are 45° and 60° respectively. The graphs illustrate the angular velocity output profile of the two profile generators in series which if integrated would result in the displacement which would advance or retard or vary the duration of the camshaft operation in various stages of its rotation. In the two examples, the flattening of the profiles indicated at b, before deceleration continues, were positioned in the graphs by the relevant parameters at about 100 and 105 rpm respectively to serve only as examples to indicate that variations in certain sections of the output profiles are possible.

In another example the two angular velocity profile generators 22 and 24 of FIG. 39 could be located between the crankshaft and flywheel of a single cylinder internal combustion engine. The crankshaft would replace the camshaft 260 and the engine flywheel the gear 48. The variability of the above parameters may be set to optimise the thermal cycle of the internal combustion engine at different speeds and loads.

Additionally in the case of the FIG. 39 example the operating angle $\phi$ may be kept fixed while $\theta_1$, $\theta_2$, $\lambda_1$ and $\lambda_2$ may be varied via the ring adjusters 84 and $\beta$ via the control member 264.

In yet a further example the two angular velocity profile generators of the FIG. 39 arrangement could be located between the drive and cutter of a milling machine or drill, the cutter would replace the camshaft 260 and the machine drive would be connected to gear 48 in FIG. 39. The variability of the profile generator parameters may be set to optimise the cutting by having suitable angular velocity profile variations in each revolution of the cutter to eliminate cutter chatter or to optimise cutting speed and wear.

Obviously a single angular profile generator may be used in the above applications in place of the two in series but it will limit the angular velocity profile variability and require the input and output shafts to be operated at an angle to each other.

Figure 42:
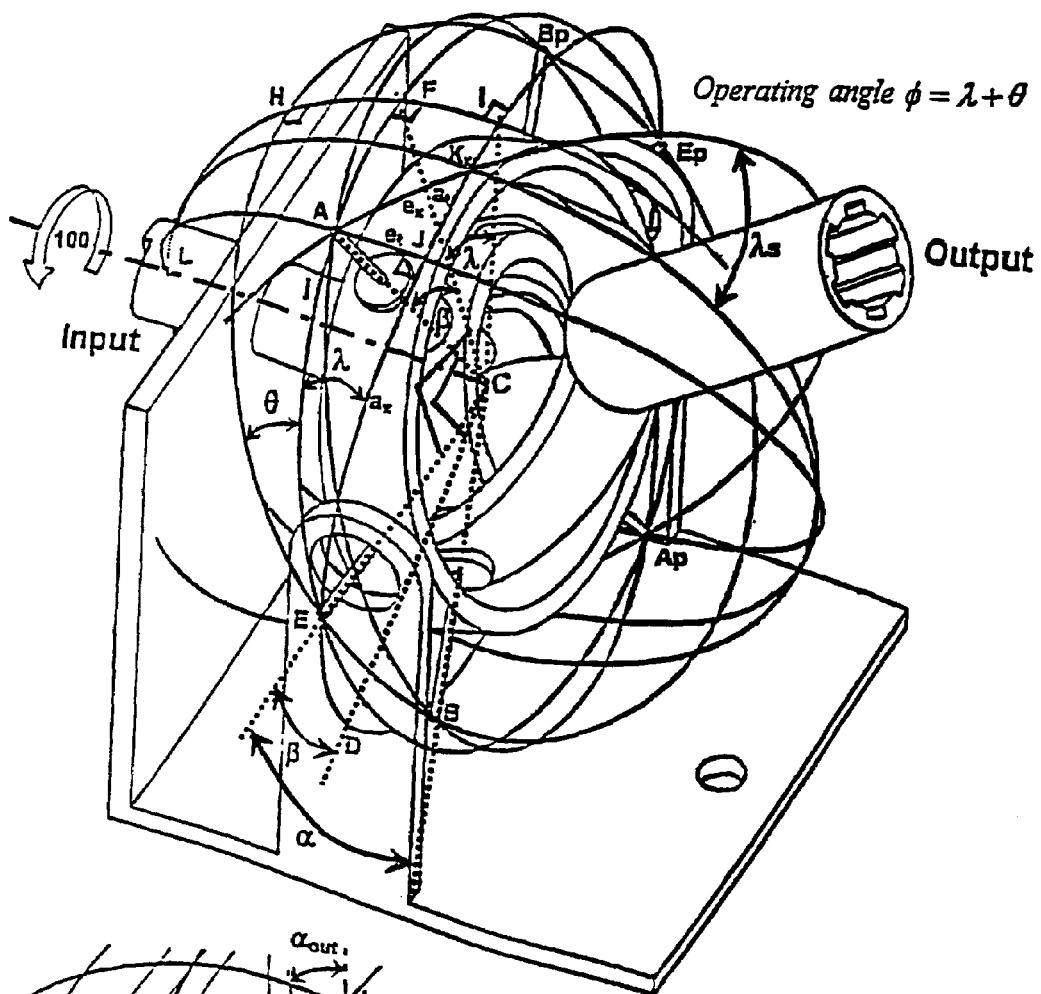
FIG. 42 is an isometric view of a single angular velocity profile generator of the invention illustrating angular variables referred to in the mathematical model of the profile generator.
Figure 43:
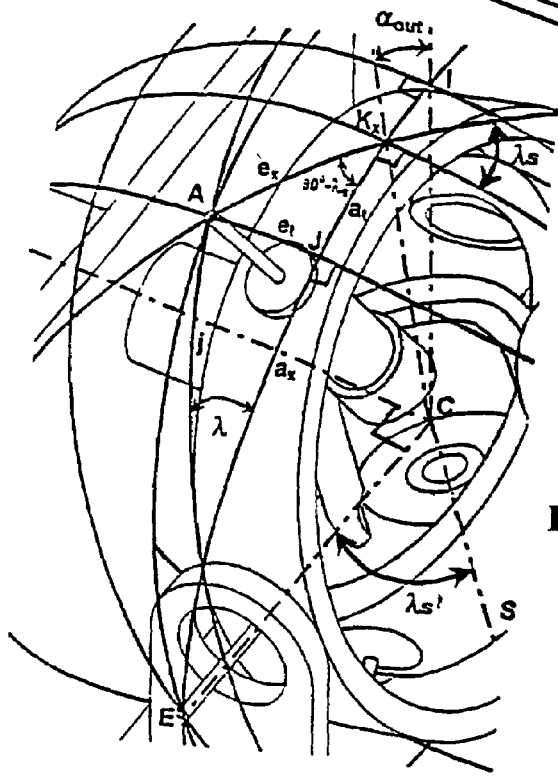
FIG. 43 is an enlarged central portion of the FIG. 42 illustration.

A Mathematical Model of the FIG. 4 Type Angular Velocity Profile Generator of the Invention The following, together with FIGS. 42 and 43 is a mathematical model of the angular velocity profile generator of the invention which may be used in the calculation of the output angular velocity profiles, of the infinitely variable transmission of the invention, which are suitable for specific applications of the machine.

The profile generator components and centreline reference numbers have been omitted from FIGS. 42 and 43 for clarity of illustration and the description of these drawings should be followed with reference to FIGS. 4 to 8. It is also to be noted that only half of each of the centrelines referred to with reference to FIGS. 42 and 43 are shown in the drawings, again for clarity of illustration.

The following are, as seen in FIGS. 42 and 43, all great circles having a static common centre point C (which corresponds to the static axis intersection point 86 in FIGS. 4,5 and 8) during rotation of the angular velocity profile generator.

$LK_x$
HE
FE
AJ
IE
HI
$AK_x$
AB

The plane of great circle $LK_x$ intersects the input shaft 46 axis 47 and is also perpendicular to the plane in which $\lambda_s$ is measured. The input shaft 46 angle, $\alpha_{out}$, is measured between the planes of great circles $LK_k$ and HI.

Great circle HE represents the path followed by the gimbal yoke 54 centre line B Bp (the plane of great circle HE is thus normal to the output shaft 56 axis 57) and the great circle FE represents the path followed by the swivel rotor 68 trunnion 70 centre line A Ap. Great circle FE thus represents the plane in which the adjuster ring 58 operates while rotating (for the adjustment of θ and λ) around the trunnions 82 axis 83 line between points E and Ep. The plane of great circle AJ presents the rotation of the input shaft 46 and thus rotates around the input shaft 46 axis 47 while intersecting with the rotor 68 trunnion pins 70 axis line A Ap. The plane of the great circle IE is normal to the input shaft 46 axis 47 and thus intersects the stationery adjuster ring 58 trunnions 82 axis 83 swivel points E and Ep. Great circle HI lies in the plane created by the input shaft 46 axis 47 and output shaft 56 axis 57. The plane of great circle $AK_s$ is normal to the swivel arrangement 49 pivot pin 62 axis 64 or line C S (See FIGS. 4 and 43). The plane of great circle AB is created by the axis of the gimbal ring 52 trunnion holes 78 and axis 75 of the gimbal ring 52 trunnions 76.

The following derives the input shaft 46 angle, $\alpha_{out}$, as a function of the output shaft 56 angle α while assuming δ=90°: (See FIG. 4).

If point A on the rotor 68 trunnion pins 70 axis is initially at point E then the yoke axis 81 of the output shaft 56 at point Bp will lag this point by 90° (δ=90°), and is shown as point F. The reason for this being the 90° (δ=90°) angle between the axis 79 of ring 52 trunnion holes 78 and the axis 75 of the ring 52 trunnions 76. As point B on the yoke 54 swivel axis 81 of the output shaft 56 moves from point E to B through an angle of α, point A on the rotor 68 trunnion pins 70 axis moves from F to A through an angle β. Locate a point D on great circle FE in such a way that angle DCE is equal to β. Thus angle ACD is a right angle, as constructed. Also angle ACB is a right angle because of the 90° (δ=90°) angle between the axis 79 of ring 52 trunnion holes 78 and the axis 75 of the trunnions 76. Consequently spherical angles ABD and ADB will be right angles. This in turn implies that spherical angle EDB is a right spherical angle. For right spherical angles the following is true:

$\cos(\theta) = \tan(\beta) \cdot \cot(\alpha)$

λ is measured from the normal of the input shaft 46 axis 47 thus the angle between great circles IE and FE illustrates the plane in which the adjuster ring 58 operates. Similarly θ is measured between the plane in which the adjuster ring 58 operates and the normal to the output shaft 56 axis 57 thus the θ angle between great circles FE and HE. The operating angle, φ, the angle between the input shaft 46 axis 47 and output shaft 56 axis 57, is equal to the sum of λ and θ.

$\lambda_s$ illustrates the angle between the swivel pivot pin 62 axis line CS (FIGS. 4 and 43) and a plane normal to the input shaft 46 axis 47 and thus the angle between great circles $AK_x$ and $LK_x$.

Thus the following relations exist:
From ΔEDB $\tan(\beta) = \cos(\theta) \cdot \tan(\alpha)$ From ΔAEJ $j = \frac{\pi}{2} - \beta$ $\sin(e_t) = \sin(\lambda) \cdot \sin\left(\frac{\pi}{2} - \beta\right)$ $\cos(\lambda) = \tan(a_x) \cdot \cot\left(\frac{\pi}{2} - \beta\right)$ From ΔAKxJ $K_x = \frac{\pi}{2} - \lambda_s$ $\sin(a_t) = \tan(e_t) \cdot \cot\left(\frac{\pi}{2} - \lambda_s\right)$ $\sin(e_t) = \sin\left(\frac{\pi}{2} - \lambda_s\right) \cdot \sin(e_x)$ From ΔEAK $\frac{\sin(e_x)}{\sin(\lambda)} = \frac{\sin\left(\frac{\pi}{2} - \beta\right)}{\sin(K_x)}$ $\cos(e_x) = \cos(a_x + a_t) \cdot \cos\left(\frac{\pi}{2} - \beta\right) + \sin(a_x + a_t) \cdot \sin\left(\frac{\pi}{2} - \beta\right) \cdot \cos(\lambda)$ The input shaft 46 angle is presented by $\alpha_{out}$. (See FIG. 43). Two solutions exist for $\alpha_{out}$ and they are:

- $\alpha_{out} = \frac{\pi}{2} - (a_x + a_t)$
- $\alpha_{out} = \frac{\pi}{2} - (a_x - a_t)$ Solving for $\alpha_{out}$ by using the above equations with the mathematical software package MathCad (or similar software package for example MatLab, Mathematica) results in the following input shaft 46 angle function from which it may be determined:

$$\alpha_{out}(\alpha, \theta, \lambda, \lambda_s, sg) = \frac{\pi}{2} - a\tan\left(\frac{\cos(\lambda)}{\cos(\theta) \cdot \tan(\alpha)}\right) +$$

$$sg \cdot a\sin\left[\frac{\sin(\lambda) \cdot \tan(\lambda_s)}{(1 + \cos(\theta)^2 \cdot \tan(\alpha)^2)^{0.5} \cdot \left[1 - \frac{\sin(\lambda)^2}{(1 + \cos(\theta)^2 \cdot \tan(\alpha)^2)}\right]^{0.5}}\right]$$

The above equation presents the angular position of the input shaft 46, $\alpha_{out}$, of a single angular velocity profile generator 22 or 24 joint where:

α—output shaft 56 angle
θ—as defined in FIG. 8
λ—as defined in FIG. 8
$\lambda_s$—pivot pin 62 angle as defined in FIG. 4
sg—two solutions exist for above equation being divided at 90 and 270 degrees of α. Thus values, sg=1 and −1 are used for the respective solutions. All above must be in radians.

The above equation can be differentiated with respect to α by use of a mathematical software package such as MathCad, MatLab or Mathematica to obtain the angular velocity function of the input shaft 46. Alternatively above equation can be numerically differentiated by incremental plot of above equation to obtain the input shaft angular velocity profile. This can easily be done on any spreadsheet such as Microsoft Excell or Lotus.

Theoretical Explanation of Output Velocity Profile

If the output shaft 56, in the case of FIGS. 42 and 43, is kept stationary with respect to the base member 28 and λ decreased, from its position in FIGS. 41 and 42, to 0° when great circles FE and IE coincide, the input shaft 46 will have rotated through angle at in the direction of arrow 100 in FIG. 42. The current position (λ=0° and $a_r$=0°) will resemble an ordinary universal joint operating at angle θ. This rotation through angle at can thus be seen as the "lost motion" that alters the ordinary universal joint velocity profile. With the correct selection of λ, θ and $\lambda_s$ the output velocity profile at the output shaft 56 can have a constant angular velocity section, as shown in FIG. 17, when constant angular velocity is applied at the input shaft 46.

It is further noted that the plane of operation of the adjuster ring 58 may be any plane and thus not necessarily one that only pivots around axis 83 as is modelled in the mathematical derivation of the profile generator.

The invention claimed is:

1. An angular velocity profile generator comprising:
a first shaft,
a second shaft,
a universal joint in which the first and second shafts are joined to each other by pivot pins which lie on two perpendicular axes which are fixed relatively to and intersect each other and the axes of the first and second shafts at a static point in the joint with the radially outer ends of the pivot pins on each of the pivot pin axes, in use, being rotatable in first and second circular paths about the static point,
a first control arrangement for moving one of the shafts relatively to the other to vary the angular relationship between them at the universal joint,
means in the universal joint which enables the path of rotation of the first universal joint pivot pin axis to be varied, in use,
relatively to the path of rotation of the second pivot pin axis about the static point in the universal joint, and
a second control arrangement, external to the universal joint, which is connected to the first pivot pin path varying means and is activated by the first control arrangement to cause, in use, as the first control arrangement is moved, the angular relationship between the first and second shafts and the first pivot pin path varying means to be adjusted in a predetermined relationship to achieve an output angular velocity profile to suit a specific application of the angular velocity profile generator.

2. A profile generator as claimed in claim 1 including spaced formations which are fixed to the second shaft and with which the pivot pins of the second pivot pin axis are pivotally engaged, a support frame including spaced first and second frame members in each of which one of the profile generator shafts is journaled for rotation and the first control arrangement is means for moving one of the frame members relatively to the other to vary the angular relationship of the two shafts in a common plane.

3. A profile generator as claimed in claim 2 wherein the first pivot pin path varying means includes a housing which is pivotally mounted in the support frame for pivotal movement on an axis which is normal to and intersects, at the static point, the common plane in which the profile generator shafts are relatively movable to each other, a bore through the housing with the axis of the bore intersecting the static point and a circular path guide in the bore in which the ends of the pivot pins on the first universal joint pivot pin axis are engaged for rotation.

4. A profile generator as claimed in claim 3 wherein the pivot pin circular path guide is a ring which is engaged in the housing bore for rotation, relatively to the housing, about the housing axis with the ends of the pivot pins on the first universal joint pivot pin axis pivotally engaged in diametrically opposite formations on the ring.

5. A profile generator as claimed in claim 3 wherein the pivot pins on the first pivot pin axis are engaged with the first shaft by an arrangement which enables the pivot pins on the first pivot pin axis to oscillate during rotation of the first and second shafts, in use, in a path of rotation about the static point in the universal joint with the path of rotation of the pivot pins being fixed and angled relatively to the first shaft axis at a predetermined angle relatively to a line which is normal to the first shaft axis at the static point in the universal joint.

6. A profile generator as claimed in claim 5 wherein the second control arrangement includes a profiled ramp formation in the support frame and a ramp follower which is connected to the housing and is adapted to move over and follow the profile of the ramp formation to cause the path of rotation of the first pivot pin axis to be angularly varied relatively to that of the second pivot pin axis with the profile of the ramp formation and the position of the ramp follower on it, in use, determining the profile of the cyclic angular velocity output of the profile generator.

7. A profile generator as claimed in claim 6 wherein the first pivot pin axis pivot pin engaging arrangement includes a second ring which is located in the first ring on a common centre at the static point with diametrically opposite pivot pins of the second pivot pin axis projecting from its outer surface to be pivotally located in the spaced formations on the second shaft, and the first pivot pin axis pivot pin first shaft connecting arrangement is a pivot shaft which is fixed to the first shaft with its axis passing through the static point in the universal joint and is angled at a predetermined angle relatively to a line, which passes through the static point, which is normal to the axis of the first shaft and a rotor on the pivot shaft which carries the pivot pins on the first pivot pin axis which is normal to the pivot shaft axis and passes through the static point in the universal joint.

8. A profile generator as claimed in claim 7 wherein the universal joint pivot pins are continuous pins which are fixed to each other in the form of a crucifix and the first universal joint axis pivot pin engaging arrangement includes two spaced arms which are fixed to the first shaft, an elongated slot in each of the arms with the longitudinal centres of the slots defining a path of rotation of the pivot pin which includes the static point in the universal joint which is angled at a predetermined angle relatively to a line which passes through the static point and which is substantially normal to the first shaft axis with the pivot pins on the first universal joint pivot axis passing through the slots with their ends pivotally located in apertures in the first ring.

9. An infinitely variable transmission machine comprising:

an angular velocity input member, an angular velocity output member, a plurality of angular velocity transmission stages which each include a cyclic angular velocity generator, an input divider arrangement with which the angular velocity input member is engaged for applying the input angular velocity, in use, to the cyclic angular velocity generator in each of the transmission stages in a fixed ratio of rotation relatively to each other, an extraction device in each transmission stage which is driven by a cyclic angular velocity generating device in that stage to extract an absolute maximum angular velocity pulse section from the output of the angular velocity generating device during each revolution of the machine input member, an output collector arrangement which is adapted to sum the extracted outputs of each of the extraction devices in each of the transmission stages and to apply the summed extraction device outputs to the machine output member, characterised in that:

the cyclic angular velocity generator in each transmission stage is the angular velocity profile generator as claimed in claim 5 with the first shaft of each of the profile generators being connected to the angular velocity input member of the machine through the input divider and their second shafts each engaged with an extraction device.

10. An infinitely variable transmission machine comprising:

an angular velocity input member, an angular velocity output member, a plurality of angular velocity transmission stages which each include a cyclic angular velocity generator, an input divider arrangement with which the angular velocity input member is engaged for applying the input angular velocity, in use, to the cyclic angular velocity generator in each of the transmission stages in a fixed ratio of rotation relatively to each other, an extraction device in each transmission stage which is driven by a cyclic angular velocity generating device in that stage to extract an absolute maximum angular velocity pulse section from the output of the angular velocity generating device during each revolution of the machine input member, an output collector arrangement which is adapted to sum the extracted outputs of each of the extraction devices in each of the transmission stages and to apply the summed extraction device outputs to the machine output member, characterised in that:

the cyclic angular velocity generator in each transmission stage is the angular velocity profile generator as claimed in claim 7 with the first shaft of each of the profile generators being connected to the angular velocity input member of the machine through the input divider and their second shafts each engaged with an extraction device.

11. An infinitely variable transmission machine comprising:

an angular velocity input member, an angular velocity output member, a plurality of angular velocity transmission stages which each include a cyclic angular velocity generator, an input divider arrangement with which the angular velocity input member is engaged for applying the input angular velocity, in use, to the cyclic angular velocity generator in each of the transmission stages in a fixed ratio of rotation relatively to each other, an extraction device in each transmission stage which is driven by a cyclic angular velocity generating device in that stage to extract an absolute maximum angular velocity pulse section from the output of the angular velocity generating device during each revolution of the machine input member, an output collector arrangement which is adapted to sum the extracted outputs of each of the extraction devices in each of the transmission stages and to apply the summed extraction device outputs to the machine output member, characterised in that:

the cyclic angular velocity generator in each transmission stage is the angular velocity profile generator as claimed in claim 8 with the first shaft of each of the profile generators being connected to the angular velocity input member of the machine through the input divider and their second shafts each engaged with an extraction device.

12. A transmission machine as claimed in claim 11 wherein the path of rotation of the pivot pins on the first universal joint pivot axis in each of the profile generators is angularly variable relatively to and includes the second universal joint pivot axis and the second control arrangement is adjusted to provide an angular velocity output profile which includes a section of linear angular velocity.

13. A transmission machine as claimed in claim 12 wherein each revolution of the machine input member causes the profile generators to produce at the input to the extraction device of each transmission stage a single, substantially sinusoidal, angular velocity which includes the section of linear angular velocity with the number of transmission stages of the machine being dependent on the number of linear velocity section durations which are required together to provide a continuous linear velocity at the output member for each revolution of the machine input member.

14. A transmission machine as claimed in claim 13 wherein each transmission stage includes two of the profile generators which are connected to each other in series with the second shaft of the first profile generator being connected to the first shaft of the second profile generator to provide an intermediate shaft between the two profile generators.

15. A transmission machine as claimed in claim 14 wherein one of the shafts of the intermediate shaft is linearly splined and the other includes a splined bore in which the splined portion of the splined shaft is telescopically slidable.

16. A transmission machine as claimed in claim 15 wherein the transmission stages of the machine are located in a common support frame with a first frame member carrying the input divider arrangement with which the first shafts of the first profile generators in each transmission stage are rotatably engaged and a second frame member which carries the extraction devices with which the second shafts of the second profile generators are engaged with the frame members being movable relatively to each other.

17. A transmission machine as claimed in claim 16 wherein the second frame member is the first control arrangement of each of the profile generators in each transmission stage and is movable relatively to the first frame member.

18. A transmission machine as claimed in claim 16 wherein the transmission stages are arranged in a side by side relationship in the common support frame with the first shafts of the first profile generators being journaled for rotation in the first frame member with the input divider comprising an input gear on each of the profile generator first shafts with the gears being meshed together in a 1:1 ratio of rotation with the angular position of each of the first profile generator shafts being rotatably phased from each other by the angular duration of the linear velocity output sections of the extraction devices.

19. A transmission machine as claimed in claim 18 wherein the second frame member is the first control arrangement of the profile generators in each transmission stage and is vertically movable on a guide arrangement which is fixed to the common support frame with the extraction devices being fixed to the second frame member with the second shafts of each of the second profile generators passing through the second frame member to be engaged with an extraction device and the machine includes, means for moving the second support frame between a first position in which all of the shafts of the profile generators in a transmission stage are aligned and a second position on the guide arrangement in which the axis of the second shaft of the second profile generator of each transmission stage is parallel to and displaced from the axis of the first shaft of the first profile generator with all of the profile generator shafts in each transmission stage, in all positions of movement of the second frame member, each being situated in a common plane with the common plane of each of the transmission stages being parallel to each other.

20. A transmission machine as claimed in claim 19 wherein the first pivot pin path varying means housing of each first profile generator in each transmission stage includes an arm which extends from the housing and operates in the plane including the axes of all of the shafts of the profile generator and carries on it the first profile generator ramp follower which follows the profile of a ramp formation which is attached to the second frame member as the second frame member is moved between its two positions of operation.

21. A transmission machine as claimed in claim 20 wherein the first pivot pin path varying means housing of each second profile generator in each transmission stage includes an arm which extends from the housing and operates in a plane including all of the axes of the shafts of both profile generators with the ramp follower on it following the profile of a ramp formation which is fixed to the support frame as the second frame member is moved between its two positions of operation.

22. A transmission machine as claimed in claim 21 wherein the angular velocity output collector comprises an output gear which is attached to and index rotated once by a transmission stage extraction device during each revolution of the machine input member with the output gears of each of the transmission stage being meshed with one another so that sequentially phased indexed rotation of the gears by the extraction devices will together provide a continuously linear output velocity at the machine output member for each single rotation of the machine input member.

23. A transmission machine as claimed in claim 22 wherein the extraction devices are each a one-way clutch such as a sprag clutch or the like.

24. A transmission machine as claimed in claim 22 wherein the output gear of each transmission stage is an externally toothed outer race of the one-way clutch.

25. A transmission machine as claimed in claim 22 wherein the extraction devices each include a first clutch plate, a second clutch plate which is fixed to the machine output gear which it index rotates and an actuator which is engaged with the second shaft of the second profile generator in the transmission stage which is connected to the extraction device for moving the clutch plates on the common axis between a first position in which they are disengaged from each other to a second position in which they are engaged with one another to index drive the second clutch plate and so the transmission stage output gear.

26. A transmission machine as claimed in claim 25 wherein the clutch plates are rings of dog clutch teeth with the second clutch ring being fixed to aside of the output gear, which is continuously rotated, in use, in the machine output collector, with the first ring being movable towards and away from the second ring by the actuator against and with the bias of a biasing spring between the clutch plates.

27. A transmission machine as claimed in claim 26 wherein the actuator includes a synchronisation arrangement which, in use, is slidably located on and continuously rotated by the second profile generator second shaft and which on movement by the actuator of the first clutch ring towards its second position of movement synchronously aligns the dog clutch teeth of the two clutch rings, prior to engagement, for perfect mesh of the dog teeth of the independently rotating clutch plate rings.

28. A transmission machine as claimed in claim 27 wherein the actuator of the extraction device of each transmission stage of the machine includes a cam arrangement which includes fixed and rotatable lobed annular cam members which surround and are free of the second shaft of the second profile generator, a drive ring for rotating the rotatable cam members with lobes on the fixed cam member acting on lobes on the rotatable cam members to cause, in use, the first clutch ring to be moved by the rotatable cam members from its first to its second position of movement for a fractional period of rotation of the second shaft of the second profile generator of each transmission stage.

29. A transmission machine as claimed in claim 28 wherein the drive rings of the extraction device in each of the transmission stages are meshed together for concomitant rotation and the machine includes a drive arrangement for driving the coupled drive rings directly from the machine input divider.

30. A transmission machine as claimed in claim 23 comprising an arrangement for reversing the direction of rotation of the output shaft of the machine including a driven gear which is engaged with and driven by the machine output collector gears, a ratio varying planetary gear arrangement, a suitable transmission arrangement which is driven by drive gear and drives a drive gear which in turn drives the first sun gear of the planetary system with the second sun gear being driven by an extended machine input shaft while the cage of the planetary system is connected to the machine output member.

31. A transmission machine as claimed in claim 24 comprising an arrangement for extending the ratio of the machine of the output shaft of the machine including a driven gear which is engaged with and driven by the machine output collector gears, a ratio varying planetary gear arrangement, a suitable transmission arrangement which is driven by drive gear and drives a drive gear which in turn drives the first sun gear of the planetary system with the second sun gear being driven by an extended machine input shaft while the cage of the planetary system is connected to the machine output member.

* * * * *